(12) United States Patent  (10) Patent No.: US 6,735,932 B2
Osborne  (45) Date of Patent: May 18, 2004

(54) VARIABLE MULCHING SYSTEM FOR A LAWNMOWER

(75) Inventor: Christopher M. Osborne, Hillsborough, NC (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/152,778

(22) Filed: May 23, 2002

(65) Prior Publication Data

US 2003/0217542 A1 Nov. 27, 2003

(51) Int. Cl.⁷ ................................................ A01D 34/64
(52) U.S. Cl. ....................................... 56/320.1; 56/17.5
(58) Field of Search ........................ 56/17.5, 255, 295, 56/320.1, 320.2, 17.4, 16.9, 17.2, 16.7

(56) References Cited

U.S. PATENT DOCUMENTS

| 3,884,020 | A |   | 5/1975  | Dahl et al.        |          |
|-----------|---|---|---------|--------------------|----------|
| 4,938,011 | A |   | 7/1990  | Pernia             |          |
| 5,179,823 | A |   | 1/1993  | Pace               |          |
| 5,191,756 | A |   | 3/1993  | Kuhn               |          |
| 5,267,429 | A |   | 12/1993 | Kettler et al.     |          |
| 5,355,666 | A |   | 10/1994 | McDonner et al.    |          |
| 5,442,902 | A | * | 8/1995  | Mosley et al.      | 56/17.5  |
| 5,457,947 | A |   | 10/1995 | Samejima et al.    |          |
| 5,491,964 | A |   | 2/1996  | Butler             |          |
| 5,499,495 | A |   | 3/1996  | Heisman et al.     |          |
| 5,826,417 | A | * | 10/1998 | Evans              | 56/320.2 |

FOREIGN PATENT DOCUMENTS

WO      WO 94/10827      5/1994

* cited by examiner

Primary Examiner—Robert E. Pezzuto
(74) Attorney, Agent, or Firm—Morgan, Lewis & Bockius LLP

(57) ABSTRACT

A lawnmower includes a cutter housing and an engine mount on the cutter housing. A prime mover is supported on the engine mount and a blade is coupled to the prime mover to rotate within the cutter housing. A plate translates within the cutter housing between a first position and a second position. Preferably, the cutter housing includes a discharge opening and the blade is a mulching blade. The first position is a full bagging position where the discharge opening is substantially unobstructed by the plate and the second position is a full mulching position where the plate substantially obstructs the discharge opening.

64 Claims, 20 Drawing Sheets

VARIABLE MULCHING SYSTEM FOR A LAWNMOWER

BACKGROUND OF THE INVENTION

Lawnmowers can be configured as garden tractors, riding mowers, commercial walk-behind mowers and smaller walk-behind mowers. Smaller walk-behind mowers include a prime mover mounted to the deck. Mower decks associated with garden tractors, riding mowers and commercial walk-behind mowers are removably attached to the frame of these self-propelled machines in a manner that allows the deck to float along the contour of the terrain above an adjustable minimum height. These floating decks rely on a power take-off connected to the prime mover used to propel these self-propelled machines and, therefore, do not include a prime mover. More than one blade can be mounted in the cutting chamber of the deck for any of these embodiments of a lawnmower.

Lawnmowers can also be configured to either mulch the clippings or to discharge the clippings through a discharge chute. Mulching mowers cut the clippings into fine particles and blow the clippings below the lawn surface. Discharge mowers either discharge the clippings directly onto the lawn surface or into a bag for disposal elsewhere. Some lawnmowers can be converted between mulching lawnmowers and discharge lawnmowers by inserting or removing separate elements within the cutter housing and/or the discharge chute.

SUMMARY OF THE INVENTION

There is provided a lawnmower including a cutter housing and an engine mount on the cutter housing. A prime mover is supported on the engine mount and a blade is coupled to the prime mover to rotate within the cutter housing. A plate translates within the cutter housing between a first position and a second position.

There is also provided a lawnmower convertible between a bagging mode and a mulching mode. The convertible lawnmower includes a cutter housing having a discharge opening, an engine mount centrally positioned on the cutter housing, a prime mover supported on the engine mount, a mulching blade, a cover and a fin. The mulching blade is coupled to the prime mover to rotate in a blade circle within the cutter housing. The cover translates across the discharge opening between a full bagging position where cover is laterally spaced from the discharge opening and a full mulching position where the cover spans the discharge opening. The fin is connected to and extends from the cover toward the mulching blade.

There is also provided a lawnmower convertible between a bagging mode and a mulching mode. The convertible lawnmower includes a cutter housing having a discharge opening, an engine mount centrally positioned on the cutter housing, a prime mover supported on the engine mount, a mulching blade and a cover. The mulching blade is coupled to the prime mover to rotate in a blade circle within the cutter housing. The cover translates along an arcuate path in the cutting chamber between a full bagging position where the cover is laterally spaced from the discharge opening and a full mulching position where the cover obstructs the discharge opening.

There is further provided a lawnmower convertible between a bagging mode and a mulching mode. The convertible lawnmower includes a cutter housing having a discharge opening, an engine mount centrally positioned on the cutter housing, a prime mover supported on the engine mount, a mulching blade coupled to the prime mover to rotate in a blade circle within the cutter housing, a cover, and a handle. The cover slides within the cutter housing between a full bagging position where the discharge opening is substantially unobstructed by the cover, a full mulching position where the cover substantially obstructs the discharge opening and at least one position intermediate the full bagging position and the full mulching position. The handle is connected to the cover and extends external to the cutter housing. The handle is displaceable between a first position, a second position and at least one position intermediate the first position and the second position such that displacement of the handle between each of the first position, the second position and the at least one intermediate position of the handle translates the cover between each of the full bagging position, the full mulching position and the at least one intermediate position of the cover, respectively.

There is further provided a control for a lawnmower accessory that includes a selector and a slidable plate connected to the selector. The selector has a first position, a second position and at least one position intermediate the first position and the second position. The slidable plate includes a first wall and a second wall extending obliquely from the first wall.

There is further provided a lawnmower convertible between a bagging mode and a mulching mode. The convertible lawnmower includes a cutter housing having a discharge opening, an engine mount on the cutter housing, a prime mover supported on the engine mount, a mulching blade coupled to the prime mover to rotate within the cutter housing, a plate, and a rotary knob operatively connected to the plate and indicia adjacent the rotary knob. The plate translates within the cutter housing between a full bagging position where the discharge opening is substantially unobstructed by the plate and a full mulching position where the plate substantially obstructs the discharge opening. The indicia indicates the operational state of the plate based on the position of the rotary knob relative to the indicia.

There is further provided a lawnmower convertible between a bagging mode and a mulching mode. The convertible lawnmower includes a cutter housing having a discharge opening, a rotary mulching blade mounted to rotate in a cutting plane within the cutter housing, and a plate translating within the cutter housing. The plate projects an area onto the cutting plane at a location where the plate overlaps the cutting plane as the plate moves between a full bagging position where the discharge opening is unobstructed by the plate and a full mulching position where the plate obstructs the discharge opening.

There is further provided a method for converting a lawnmower between a first operational mode and a second operational mode. The lawnmower includes a discharge chute coupled to a cutter housing via a discharge opening. The method includes establishing a first effective cross-sectional area for the discharge opening when the lawnmower is in the first operational mode, establishing a second effective cross-sectional area different from the first effective cross-sectional area for the discharge opening when the lawnmower is in the second operational mode, and establishing a third effective cross-sectional area different from the second effective cross-sectional area for the discharge opening when the lawnmower is in a third operational mode.

There is further provided a method of converting a lawnmower between a first operational mode, a second operational mode, and a third operational mode. The lawn mower includes a discharge chute coupled to a cutter housing via a discharge opening. The method includes varying the effective cross-sectional area of the discharge opening to switch the lawunower between the first operational mode, the second operational mode, and the third operational mode.

There is further provided a method of varying operational modes of a lawnmower including changing the effective cross-sectional area of a discharge opening that couples a discharge chute to a cutter housing between one of a first area, a second area from the first area, and a third area different from the second area.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
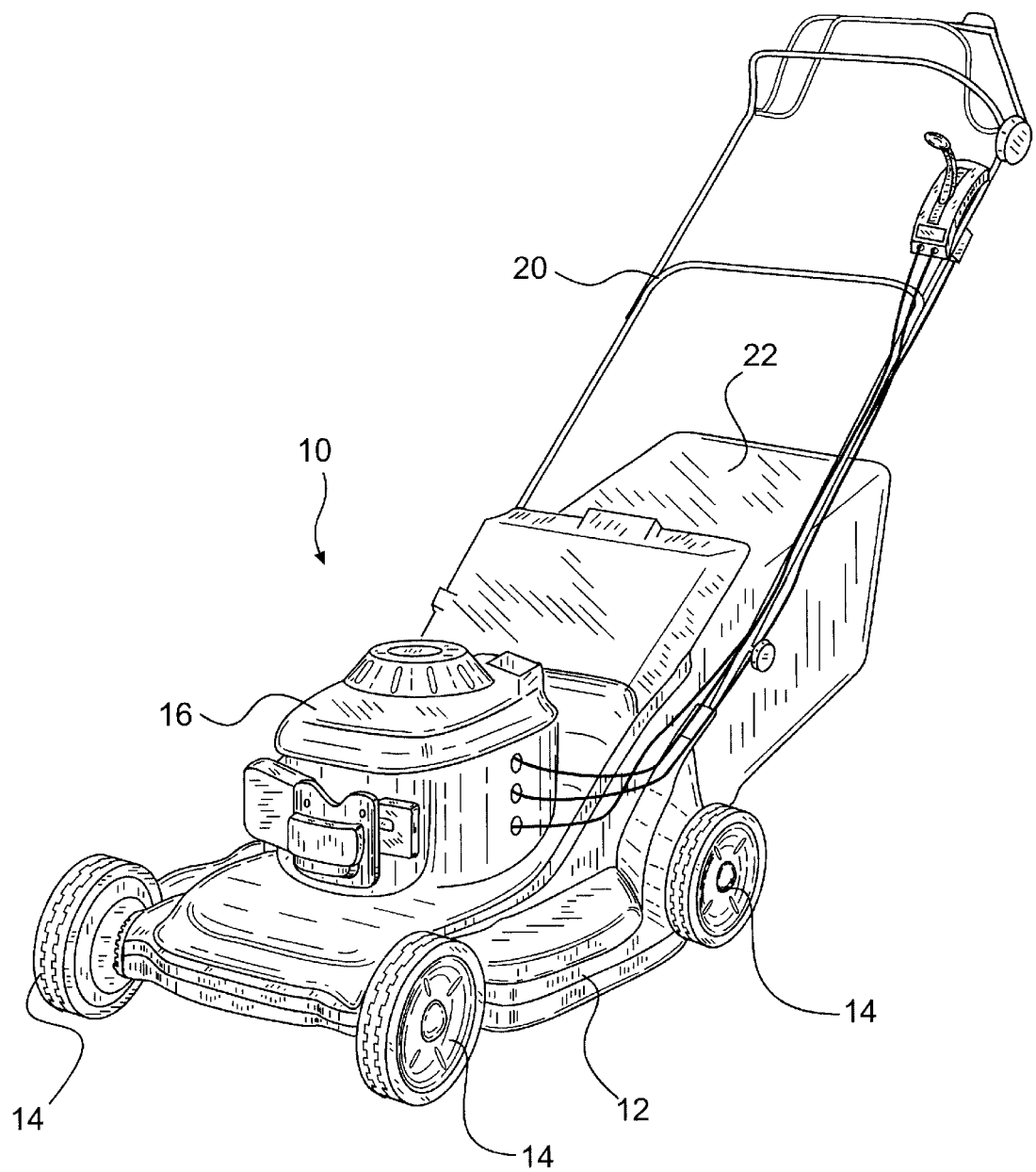
FIG. 1 is a perspective view of a lawnmower according to the present invention.

Referring to FIG. 1, a lawnmower 10 includes a deck 12, wheels 14, a prime mover 16 (e.g., an internal combustion engine or an electric motor) mounted to the deck 12, a blade 18 (see FIG. 2) connected to the prime mover 16 below the deck 12, a steering handle 20 connected to and extending upwardly from the deck 12 and a collection bag 22.

Figure 5:
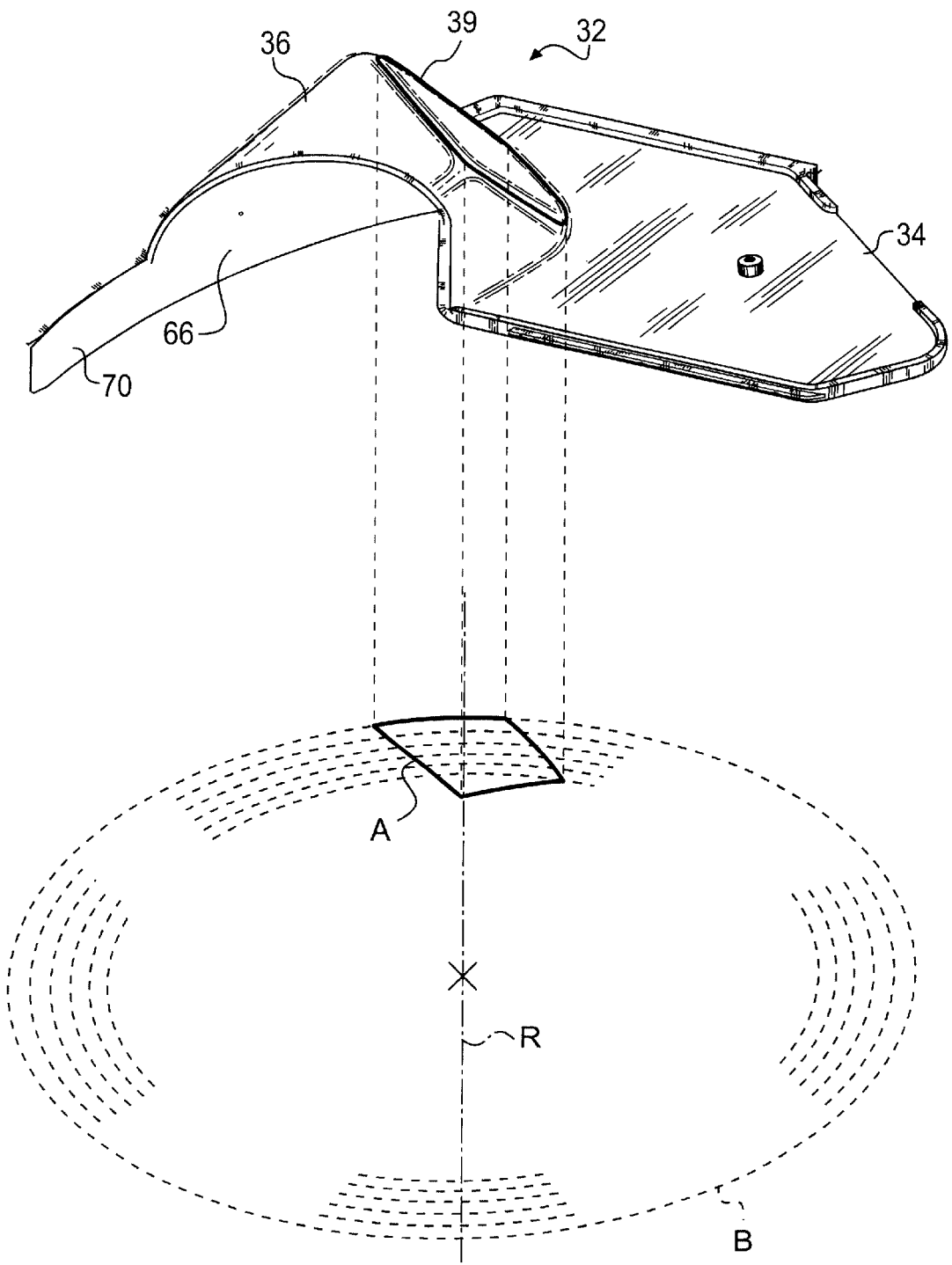
FIG. 5 is a front perspective view of the top of a lawnmower accessory of FIG. 4.
Figure 6:
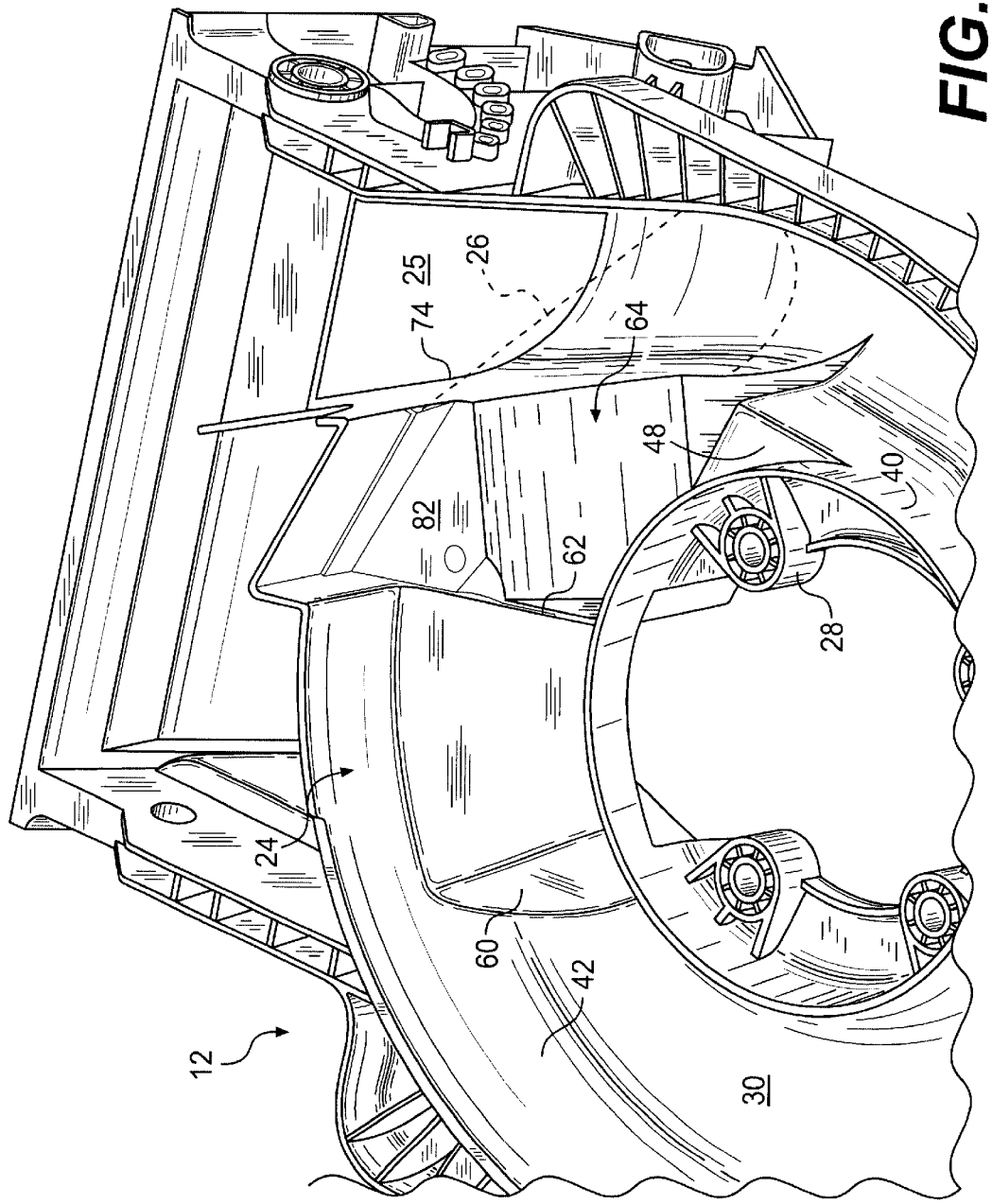
FIG. 6 is perspective view of the bottom of the lawnmower of FIG. 2 with the lawnmower accessory removed.

FIGS. 2, 3a–3c, and 6–8 show the deck 12 upside down relative to FIG. 1. The outer plate support 44 (described below) is omitted from FIGS. 3a–3c for clarity. FIG. 5 depicts the plate 32 (described below) right side up relative to FIG. 1. FIG. 6 shows the deck 12 with both the plate 32 and the outer plate support 44 omitted for clarity.

Figure 2:
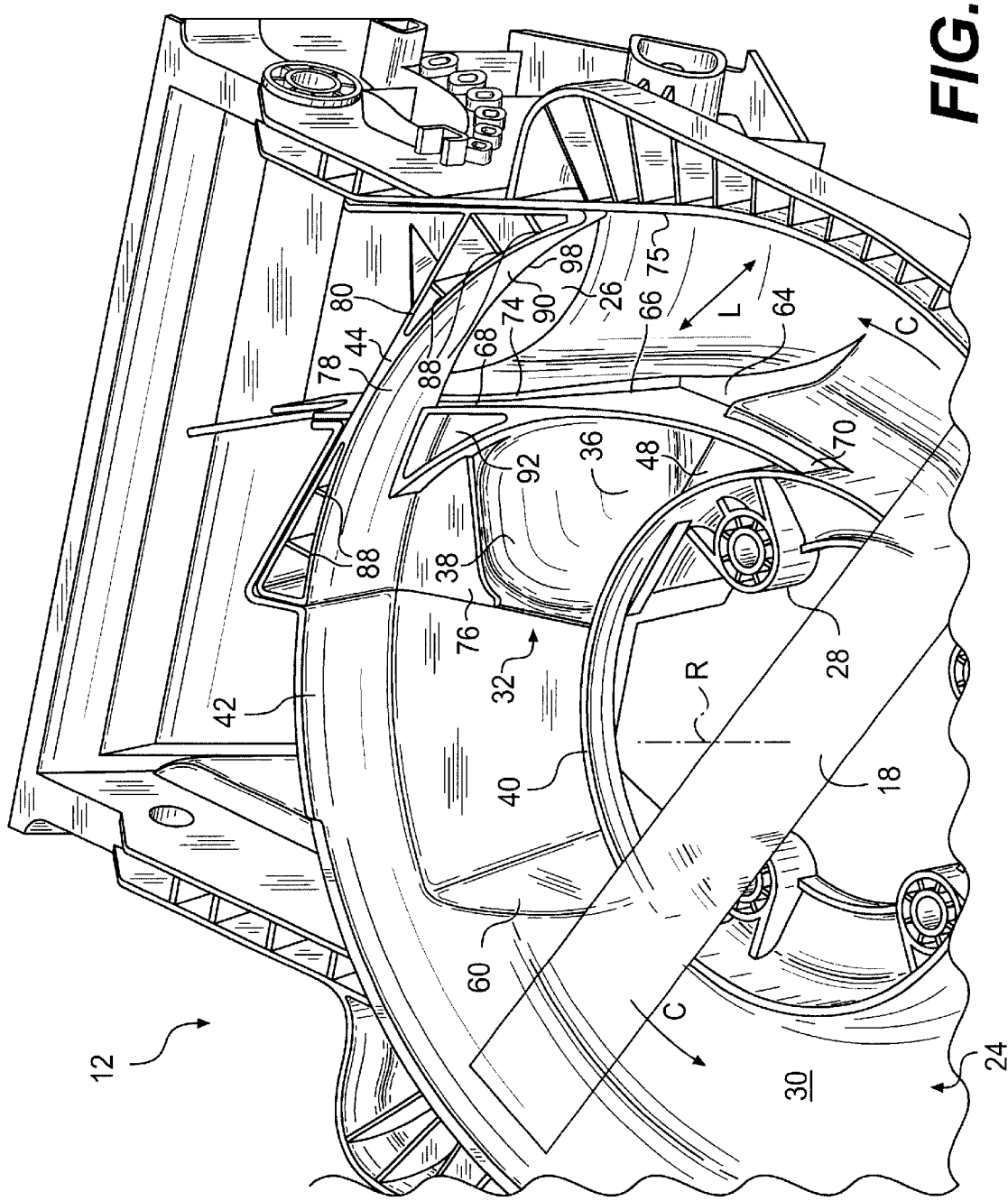
FIG. 2 is a perspective view of the bottom of a lawnmower including a lawnmower accessory of a first embodiment according to the present invention.
Figure 11:
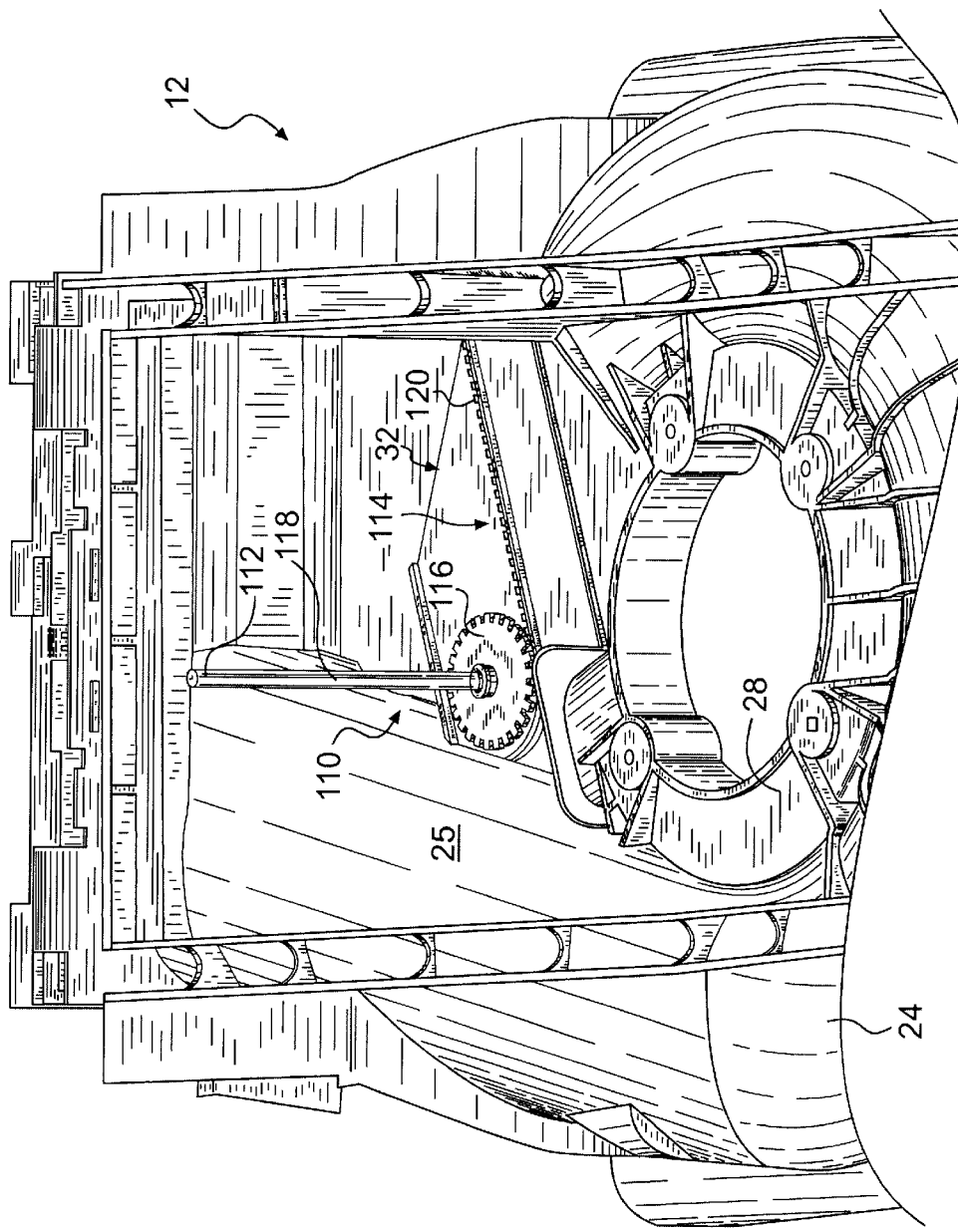
FIG. 11 is a front perspective view of the top of the lawnmower of FIG. 2 showing one embodiment of an actuation transmission according to the invention.

Referring to FIGS. 1, 2 and 11, the deck 12 includes a toroidal cutter housing 24 and a discharge chute 25 extending from the toroidal cutter housing 24. The toroidal cutter housing 24 includes a discharge opening 26 (also represented by a dotted line in FIGS. 3a and 3b) at the junction of the cutter housing 24 and the discharge chute 25. The collection bag 22 can be connected to the discharge chute 25 to collect the clippings for disposal away from the lawn.

The deck 12 also includes an engine mount 28 centrally positioned on the cutter housing 24. As shown in FIG. 1, the prime mover 16 is supported on the engine mount 28.

The blade 18 is coupled to the prime mover 16 (omitted from FIG. 2 for clarity) to rotate within the cutter housing 24. Preferably, the blade 18 is a mulching blade configured as either a single cutting element or as multiple cutting elements. The blade 18 rotates about a rotation axis R in a blade circle B (see FIG. 5) lying in a cutting plane. The vegetation is cut at the level of the cutting plane and circulates adjacent the roof 30 of the cutter housing 24 along a circulation path C until a saturation amount of circulating clippings is reached. Upon reaching the saturation level, the circulating clippings begin to fall back down across the blade 18 where they are cut again and blown into the lawn below the level of the cutting plane.

Figure 3A:
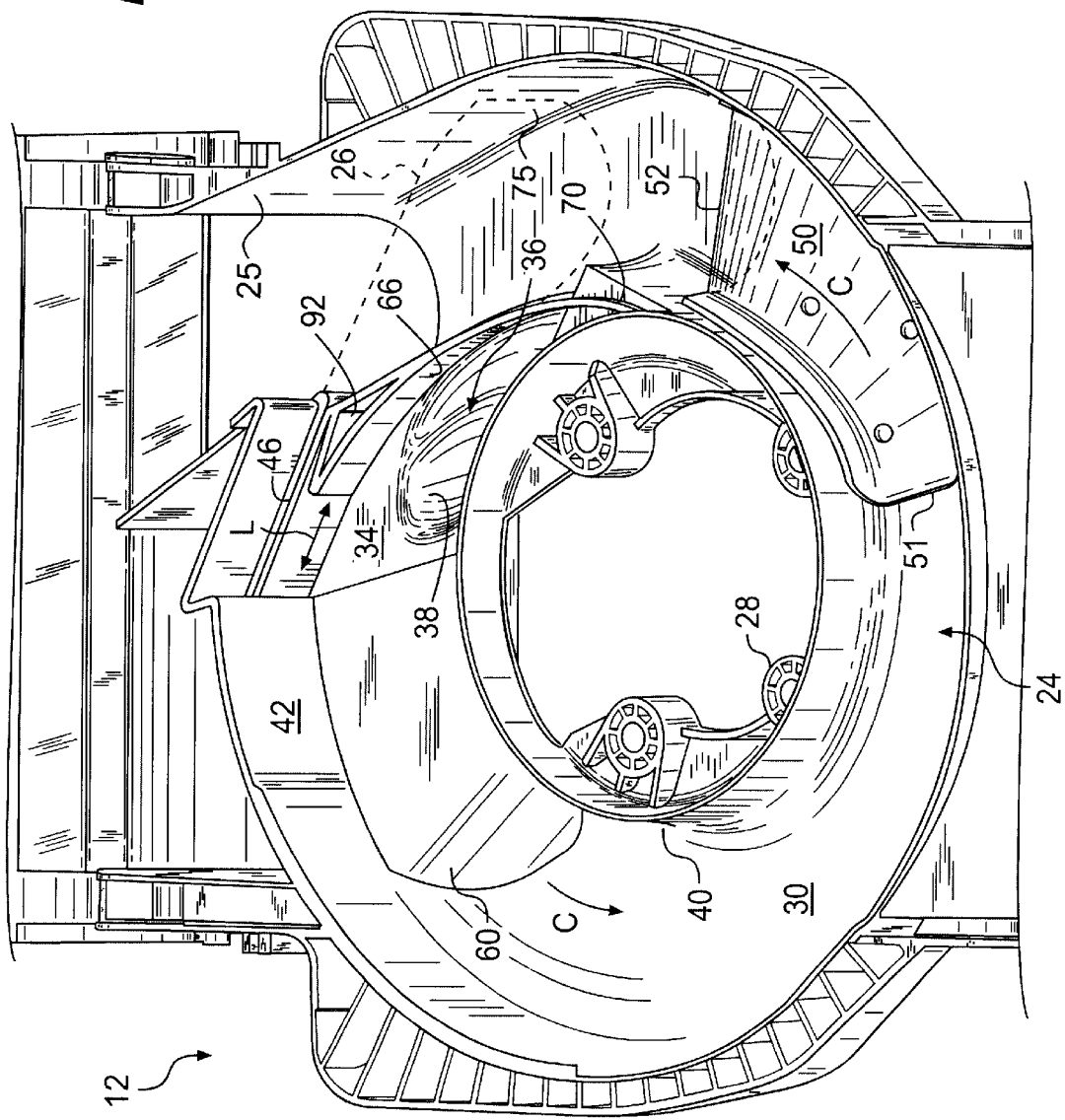
FIG. 3a is front perspective view of the bottom of the lawnmower of FIG. 2 showing the lawnmower accessory in a first position.
Figure 3B:
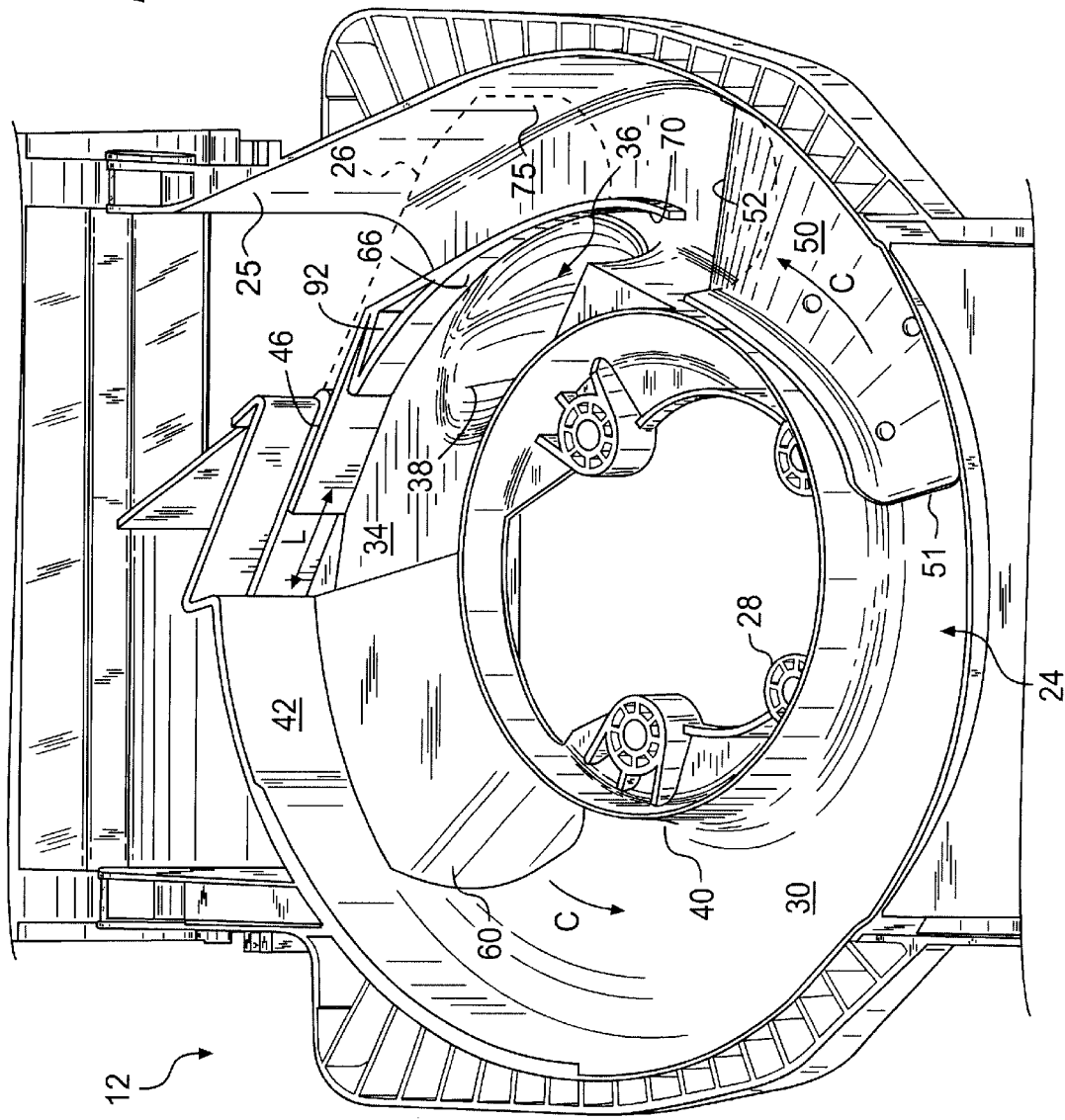
FIG. 3b is front perspective view of the bottom of the lawnmower of FIG. 2 showing the lawnmower accessory in an intermediate position.
Figure 3C:
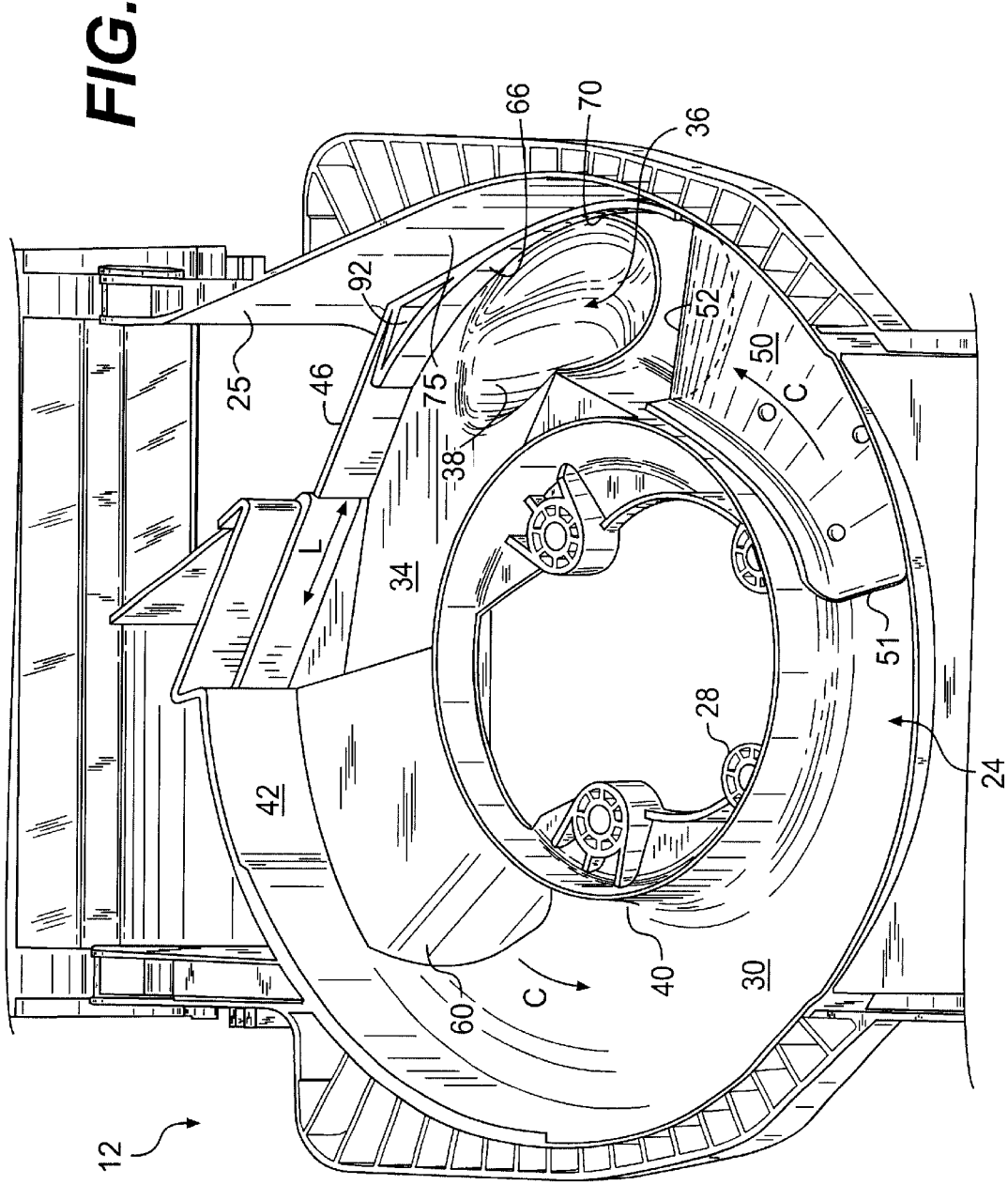
FIG. 3c is front perspective view of the bottom of the lawnmower of FIG. 2 showing the lawnmower accessory in a second position.
Figure 7:
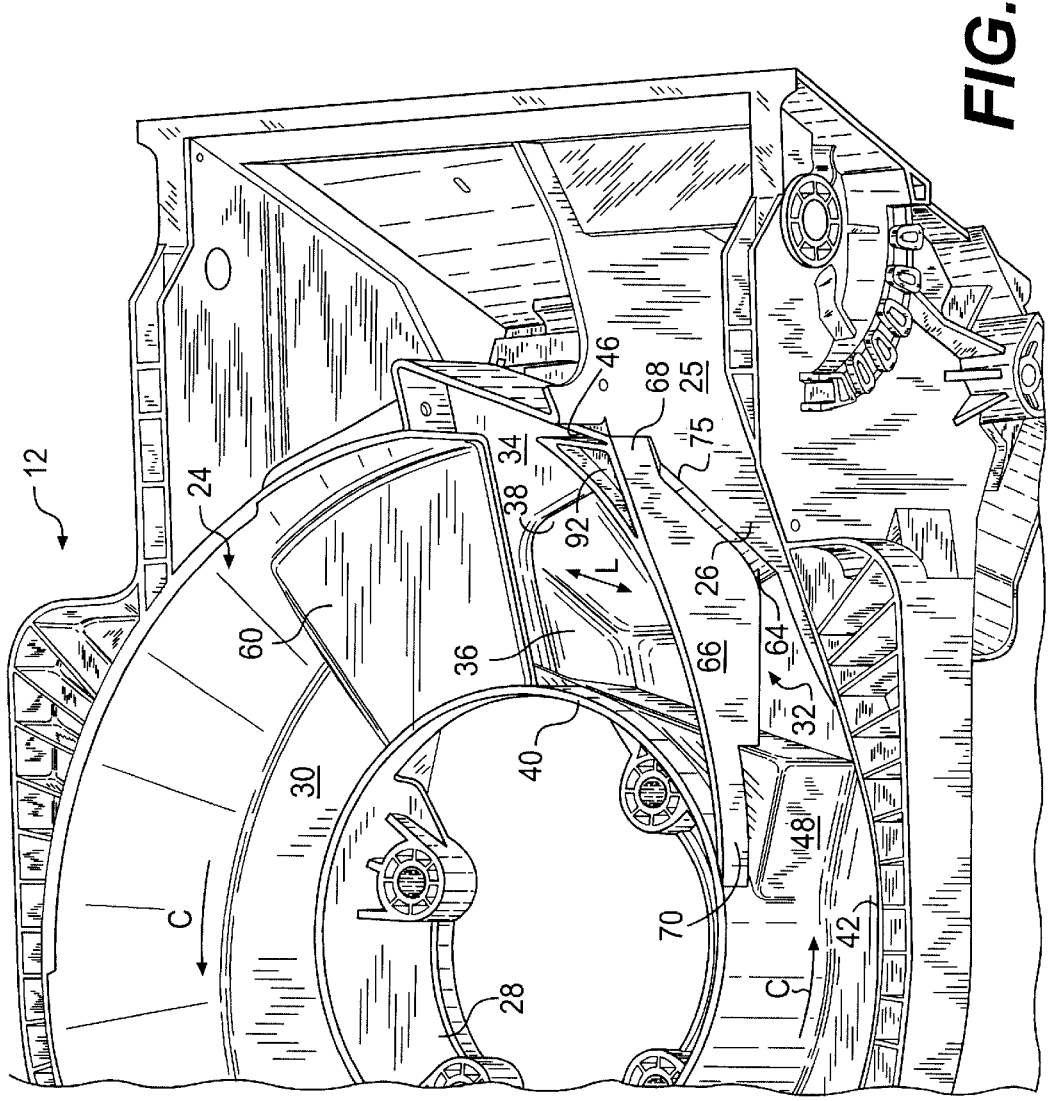
FIG. 7 is a side perspective view of the bottom of a partially assembled lawnmower of FIG. 2.
Figure 8:
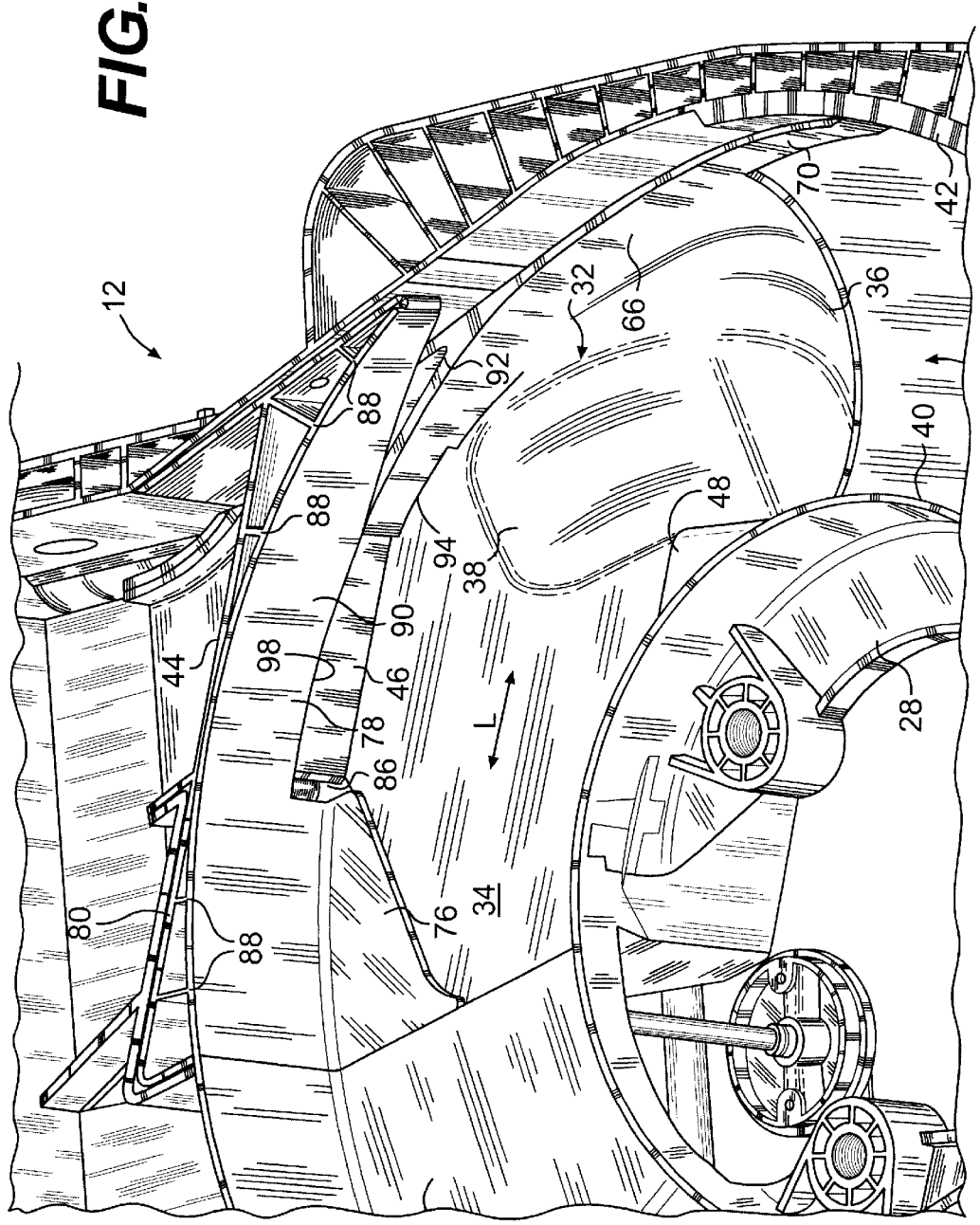
FIG. 8 is a front perspective view of the bottom of a lawnmower accessory of the lawnmower of FIG. 2 with the lawnmower accessory in a second position.

FIGS. 2–5, 7 and 8 show a lawnmower accessory 32 configured as a plate that translates within the cutter housing 24 between a first position (FIGS. 2 and 3a) and a second position (FIGS. 3c and 8). Referring to FIGS. 3c and 8, in this first embodiment of the lawnmower accessory, the plate 32 translates along a linear path L between the first position and the second position. During such linear translation, every point on the plate 32 is displaced between a corresponding first position and a corresponding second position spaced by the same linear distance.

The first position can be a full bagging position where the discharge opening 26 is substantially unobstructed by the plate 32 (FIGS. 2 and 3a) and the second position can be a full mulching position where the plate 32 substantially obstructs the discharge opening 26 (FIGS. 3c and 8). Additionally, the plate 32 can translate to at least one position intermediate the first position and the second position (FIG. 3b). Preferably, the cutter housing 24 is annular and the plate 32 extends along a sector of the cutter housing, as shown in FIGS. 3a–3c.

Referring to FIGS. 3a–5, 7 and 8, the plate 32 preferably includes a horizontal wall 34 extending parallel to the blade circle B and a cover 36 extending from the horizontal wall 34 toward the roof 30 and away from the blade circle B. The cover 36 extends obliquely from the horizontal wall 34. In this first embodiment, the horizontal wall 34 is flat and the cover 36 is concave facing the blade circle B.

Referring to FIGS. 3a–3c, the lawnmower 10 is convertible between a first operational mode and a second operational mode by translating the cover 36 across the discharge opening 26 between the full bagging position (FIG. 3a) where cover 36 is laterally spaced from the discharge opening 26 and the full mulching position (FIG. 3c) where the cover 36 spans the discharge opening 26. Preferably, the cover 36 additionally can translate to at least one position intermediate (FIG. 3b) the fill bagging position and the full mulching position where the cover 36 partially obstructs the discharge opening 26. The lawnmower 10 is in an intermediate operational mode when the cover 36 is in the at least one intermediate position. The cover 36 translates between each of the full bagging position, the at least one intermediate position and the full mulching position along the linear path L.

As shown in FIGS. 2–5, 7 and 8, the cover 36 has a major operating face 38 that extends obliquely relative to the cutting plane and it projects an area A onto the cutting plane at a location where the cover 36 overlaps the cutting plane. The major operating face 38 is opposite the back surface 39 indicated in FIG. 5. Preferably, as shown in FIG. 5, the cover 36 overlaps the cutting plane within the perimeter of the blade circle B and the projected area A lies within the blade circle B. Alternatively, the location and/or size of any combination of the discharge opening 26, the cover 36 and the cutter housing 24 can be changed from that illustrated in FIGS. 2–5, 7 and 8 such that the projected area A can lie partially or completely outside of the blade circle B.

The major operating face 38 controls the circulation of the clippings within the cutter housing 24. Referring to FIGS. 2, 3a–3c and 8, as the major operating face 38 translates between the full bagging position and the full mulching position, the major operating face 38 extends by various degrees into the circulation path C of the clippings circulating in the cutter housing. The circulating clippings that strike the major operating face 38 of the cover 36 are redirected by the cover 36 from the roof 30 of the cutter housing 24 toward the blade 18 where they are mulched and blown into the lawn by the blade 18. When the cover 36 is in the full mulching position, the cover 36 substantially obstructs the discharge opening 26 so that substantially all of the circulating clippings are redirected toward the blade 18 for mulching. When the cover 36 is in any position other than the full bagging position, at least a portion of the discharge opening 26 is unobstructed so that at least some of the circulating clippings can escape from the cutter housing 24 through the discharge opening 26 while the remaining circulating clippings can be mulched.

The discharge opening 26 has a first effective cross-sectional area when the cover 36 is in the full bagging position (FIG. 3a), a second effective cross-sectional area when the cover 36 is in the at least one intermediate position (FIG. 3b), and a third effective cross-sectional area when the cover 36 is in the full mulching position (FIG. 3c).

Referring to FIGS. 2 and 3a, the first effective cross-sectional area is defined by the guide support 98, the roof 30, the outer scroll 42, an inner edge 74, and an outer edge generally indicated at 75. The effective first cross-sectional area is the maximum cross-sectional area for the discharge opening 26.

Referring to FIGS. 2 and 3b, placing the cover 36 in the at least one intermediate position provides a second effective cross-sectional area that is different from the first effective cross-sectional area. The second effective cross-sectional area is defined by the guide support 98, the roof 30, outer edge 75, and the outer edge (not numbered) of the plate 32. A comparison of FIGS. 3a and 3b shows that when in the at least one intermediate position, the outer edge of the plate 32 lies intermediate the inner edge 74 and the outer edge 75, such that the second effective cross-sectional area is less than the first effective cross-sectional area. The plate 32 can be placed in any one of a plurality of intermediate positions and each intermediate position has a unique effective cross-sectional area.

Referring to FIGS. 2 and 3c, placing the cover 36 in the full mulching position provides an third effective cross-sectional area that is different from each of the first effective cross-sectional area and the second effective cross-section area. The third effective cross-sectional area is defined by the guide support 98, the roof 30, the outer edge 75, and the outer edge of the plate 32. In this position, the outer edge of the plate 32 is adjacent the outer edge 75 and the third effective cross-sectional area is approximately zero. A comparison of FIGS. 3b and 3c shows that the third effective cross-section is less than the second effective cross-sectional area and a comparison of FIGS. 3a and 3c shows that the third effective cross-sectional area is less than the first effective cross-sectional area.

Under adverse mowing conditions, such as wet vegetation, tall vegetation or thick vegetation, the clippings can clog the discharge opening 26 before the collection bag 22 is full or cause clumping even when mulching the clippings. Also, when such mowing conditions exist when the lawnmower 10 is in the full mulching mode, the amount of clippings circulating in the cutter housing 24 can overwhelm the prime mover 16 and cause it to stall. These results can require repeated stopping and starting of the lawnmower 10 that, in turn, can extend the time necessary to mow the lawn.

By regulating the position of the cover 36 in response to the cutting conditions, the operator can vary the cross-sectional area of the discharge opening 26 and, therefore, control the amount of clippings being collected and mulched at any given time so that clogging, clumping and stalling of the prime mover 16 can be minimized during these adverse mowing conditions. With the cover 36 in the full mulching position, the operator can translate the cover 36 toward the full bagging position if the clippings begin to clump until enough of the clippings pass through the discharge opening 26 and into the collection bag 22 such that the stalling condition ceases. Conversely, with the cover 36 in the full bagging position, the operator can continue to mow when the access to the collection bag 22 becomes clogged with clippings by positioning the cover 36 in any position other than the full bagging position so that at least some of the clippings are mulched. Positioning the cover 36 in any one of the intermediate positions minimizes unwanted clumping or stalling of the prime mover 16 because some of the clippings escape the cutter housing 24 through the discharge opening 26 and are collected in the collection bag 22 while the remainder get mulched.

Referring to FIGS. 2–3c and 6–8, the cutter housing 24 can also include an inner scroll 40 and an outer scroll 42. The inner scroll 40 is centered about the engine mount 28 and located at the inner radius of the cutter housing 24. The outer scroll 42 is centered about the inner scroll 40 and located at the outer radius of the cutter housing 24. As shown in FIGS. 2–3c, 6 and 7, the discharge opening 26 is in the outer scroll 42. Referring to FIGS. 2–3c, 7 and 8, the plate 32 extends radially from the inner radius to the outer radius to span from the inner scroll 40 to the outer scroll 42 in each of the first position, the second position and the at least one intermediate position.

FIGS. 2 and 8 illustrate an outer plate support 44 that is connected to the outer scroll 42 and extends across the discharge opening 26. The outer plate support 44 has a curvature equal to the curvature of the outer scroll 42. As shown in FIGS. 3a–4, 7 and 8, the plate 32 includes a flange 46 on the horizontal wall 34 extending from the horizontal wall 34 toward the blade circle B. The flange 46 is slidably received on the outer plate support 44 as will be explained below.

As will be explained in detail below, the outer plate support 44 cooperates with the plate 32 to maintain plate 32 above the blade 18 and properly oriented relative to the discharge opening 26 as the plate 32 transitions between the full mulching position and the full bagging position.

As shown in FIGS. 3a–3c and 9, a ramp 50 is mounted to the roof 30 of the cutter housing 24 near the plate 32. As will be discussed below, the ramp 50 cooperates with the plate 32 to divert clippings in the circulation path C into the discharge opening 26 when the plate 32 is in any position other than the full mulching position.

The ramp 50 includes a leading edge 51 adjacent the roof 30 and a trailing edge 52 spaced from the roof 30 by a rear face 53. The rear face 53 extends from the trailing edge 52 to the roof 30 and conforms to the interior profile of the cutter housing 24. Preferably, the trailing edge 52 lies approximately co-planar with horizontal wall 34 and proximate the cover 36. The ramp 50 can divert clippings from the roof 30 toward the blade 18 to a level at least even with the horizontal wall 34. Preferably, the spacing between the trailing edge 52 and the plate 32 is sufficiently small so that the updraft created by the blade 18 does not strongly redirect the clippings at the cover 36. The trailing edge 52 is aligned with a radius of the cutter housing 24 and positioned at approximately the three o'clock position of the cutter housing 24 as viewed in FIGS. 3a–3c. However, the trailing edge 52 can have other orientations in the cutter housing 24 that do not aim the circulation path C directly at the cover 36.

The change in direction from the roof 30 toward the blade circle B and then back toward the roof 30 for the circulating clippings reduces the potential for the clippings to clump onto the plate 32 when the plate 32 is any position other than the full mulching position. Clumps formed on the plate 32 can adversely obstruct the circulation path C and reduce the efficiency at which the clippings are bagged and/or mulched.

The ramp 50 also includes an inner flange 54 and an outer flange 55 that extend along and conform to the inner scroll 40 and the outer scroll 42, respectively.

The ramp 50 can be secured to the roof 30 of the cutter housing by mounting bosses 56 adapted to receive fasteners, such as self-tapping screws (not shown). Alternatively, the ramp 50 can be integrally formed in the roof 30 of the cutter housing 24. The length of the ramp 50 as measured in the direction of the circulation path C and the inclination of the ramp 50 can be any desired size.

This diversion of the clippings can reduce the amount of clippings striking the cover or at least soften the impact of the clippings onto the plate 32. By reducing the amount of clippings striking against the plate 32, the potential for the clippings to clump onto the cover 36 when the plate 32 is a position other than the full mulching position can be reduced. Clumping on the cover 36 and/or other portions of the plate 32 can obstruct the circulation path C and reduce the efficiency at which the clippings are bagged and/or mulched.

The ramp 50 can also extend the area of the lawn over which the lawnmower 10 traverses while mowing before the collection bag 22 requires emptying when the plate 32 is in any position other than the full mulching position. The ramp 50 could divert a portion of the clippings across the blade 18 so that they are mulched by the blade 18 and blown into the lawn. Thus, the amount of clippings collected in the collection bag 22 can be reduced. Although the ramp 50 is not necessary for effective operation of the plate 32, the ramp 50 can enhance the performance offered by the plate 32.

FIGS. 2, 3a–3c and 6–8 show an inner plate support 48 that is positioned adjacent the inner scroll 40. The inner plate support 48 is configured as a shelf extending from the inner scroll 40 toward the outer scroll 42. A portion of the plate 32 is slidably received on the inner plate support 48, as will be explained below.

Referring to FIGS. 2, 3a–3c and 6–8, a belt drive housing 60 extends into the cutter housing 24 near the discharge opening 26. A horizontal slot 62 (FIG. 6) opens into the belt drive housing 60. A recess 64 (FIG. 6) is located intermediate the discharge opening 26 and the belt drive housing 60. As illustrated in FIGS. 2 and 7, the recess 64 receives the cover 36 when the cover 36 is in the full bagging position.

Referring to FIGS. 2–5, 7 and 8, an arcuate fin 66 connects to and extends from the cover 36 toward the blade circle B. The fin 66 includes a first end 68 connected to the cover 36 and a second end 70 positioned beyond the extent of the cover 36. FIG. 5 illustrates the plate 32 right-side up relative to FIG. 1. The fin 66 extends from the cover 36 toward the blade circle B beyond the level of horizontal wall 34.

As shown in FIGS. 2, 3a–3c and 8, the second end 70 of the fin 66 engages the inner scroll 40 and slidably engages the shelf 48 when the fin 66 is in the full bagging position (FIGS. 2 and 3a). The second end 70 of the fin 66 is intermediate and engages neither the inner scroll 40 and the outer scroll 42 when the fin 66 is in the at least one intermediate position (FIG. 3b). The second end 70 of the fin 66 engages the outer scroll 42 when the fin 66 is in the full mulching position (FIGS. 3c and 8).

The first end 68 of the fin 66 lies adjacent the outer scroll 42 at a first location when the fin 66 is in the full bagging position (FIGS. 2 and 3a). The first end 68 of the fin 66 lies adjacent the outer scroll 42 at a second location spaced from the first location when the fin 66 is in the full mulching position (FIGS. 3c and 8). The first end 68 of the fin 66 lies adjacent the outer scroll 42 at a location intermediate the first location and the second location when the fin 66 is in the at least one intermediate position (FIG. 3b).

The fin 66 is located in the circulation path C of the clippings to ensure at least some of the clippings are directed toward discharge opening 26 when the fin 66 is in any of the positions other than the full mulching position. Referring to FIGS. 2 and 3a, when the fin 66 is in the full bagging position, the fin 66 spans from the inner scroll 40 to the outer scroll 42 so that the fin substantially obstructs the circulation path C. In the full bagging position, the fin 66 is aligned relative to the inner edge 74 of the discharge opening 26 so that substantially all of the clippings are directed through the discharge opening 26.

Referring to FIGS. 2 and 8, the outer plate support 44 is separable from the cutter housing 24 and includes a horizontal flange 76 and an arcuate wall 78. The arcuate wall 78 forms part of the outer scroll 42 and defines the bottom edge of the discharge opening 26. Another wall 80 extends tangentially from the arcuate wall 78 at a position adjacent the inner edge 74 of the discharge opening 26. The tangential wall 80 of the outer plate support 44 is aligned with a vertical slot 86 and extends across the discharge opening 26.

Referring to FIG. 6, a stepped-down surface 82 is intermediate the belt drive housing 60 and the discharge opening 26. The horizontal slot 62 is formed in the cutter housing 24 where the stepped-down surface 82 adjoins the belt drive housing 60. The horizontal flange 76 is positioned at the same level as the belt drive housing 60 and separated from the stepped-down surface 82 by a space aligned with the horizontal slot 62.

FIGS. 2 and 8 show the outer plate support 44 as having the horizontal flange 76, the arcuate wall 78, the tangential wall 80 and the guide support 98 integrally formed as a single piece. Alternatively, these components can be formed individually or as various subassemblies and then secured together by mechanical fasteners, adhesive, welding or other similar fastening technique. The outer plate support 44 can be made from plastic or metal or a combination of different materials optimized to promote the particular function of each component 76, 78, 80, 98 of the outer plate support 44 and or assembly of the outer plate support 44 into the cutter housing 24.

FIGS. 2 and 8 show the arcuate wall 78 and the tangential wall 80 separately formed and then connected to the cutter housing 24 to complete the outer scroll 42 across the discharge opening 26. Alternatively, the outer scroll 42 can include the arcuate wall 78 and the tangential wall 80 as integrally formed portions.

FIG. 8 illustrates that the arcuate wall 78 has an opening at the junction with the tangential wall 80 to provide a vertical slot 86 in the cutter housing 24 adjacent the discharge opening 26. A plurality of ribs 88 spans from the tangential wall 80 to the arcuate wall 78. Assembly of the plate 32 in the cutter housing 24 can be simplified by providing the outer plate support 44 as a separate piece to the cutter housing 24. During assembly, the horizontal wall 34 can be inserted into the horizontal slot 62 (FIGS. 6 and 7). Then outer plate support 44 can be secured to the cutter housing 24 so that the horizontal wall 34 slides between and along the horizontal flange 76 and the stepped-down surface 82.

Referring to FIGS. 6–8, the horizontal wall 34 laterally extends from the cover 36 and slidably engages the horizontal slot 62 as the plate 32 translates between the full bagging position and the full mulching position. As shown in FIGS. 3a–5 and 8, the flange 46 extends from the horizontal wall 34 toward the blade circle B and slidably engages the vertical slot 86 and the outer plate support 44 when the plate 32 is in the full mulching position and positions proximate the full mulching position.

Referring to FIGS. 2–4, 7 and 8, a guide 92 extends from the first end 68 of the fin 66 and toward the horizontal wall 34. The guide 92 is spaced above the horizontal wall 34 to define a slot 94 therebetween. The guide 92 engages the outer plate support 44 when the fin 66 translates between the full bagging position and the full mulching position. The guide 92 is triangular in shape. As shown in FIGS. 2 and 3a, when the plate 32 is in the full bagging position, the guide 92 contacts the arcuate face 90 of the outer plate support 44.

Comparing FIGS. 2 and 8, as the plate 32 translates from the full bagging position to the full mulching position, the guide 92 transitions across the guide support 98 of the outer plate support 44 such that the outer plate support 44 supports more of the guide 92 as the plate 32 approaches the full mulching position. As shown in FIG. 8, when the plate 32 is in the full mulching position, the guide support 98 of the outer plate support 44 supports the guide 92. Thus, the cover 36 and the fin 66 are guided and supported by the inner plate support 48 and the outer plate support 44 as the cover 36 and the fin 66 translate between the full bagging position and the full mulching position.

Figure 4:
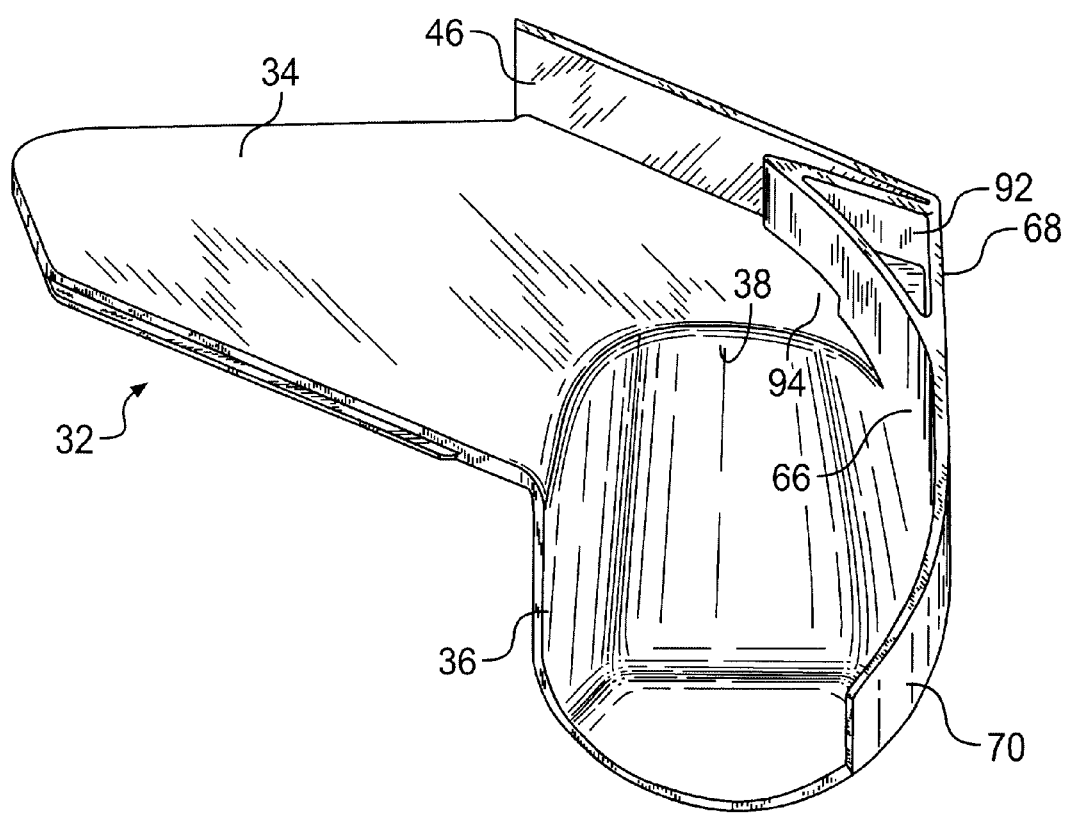
FIG. 4 is a front perspective view of the bottom of the lawnmower accessory of the lawnmower of FIG. 2.

FIG. 4 illustrates the plate 32 as having the horizontal wall 34, the cover 36, the flange 46, the fin 66 and the guide 92 integrally formed as a single piece. Alternatively, these components can be formed individually or as various subassemblies and then secured together by mechanical fasteners, adhesive, welding or other similar fastening technique. The plate 32 can be made from plastic or metal or a combination of different materials optimized to promote the particular function of each component 34, 36, 46, 66, 92 of the plate 32 and or assembly of the plate 32 into the cutter housing 24.

Figure 10:
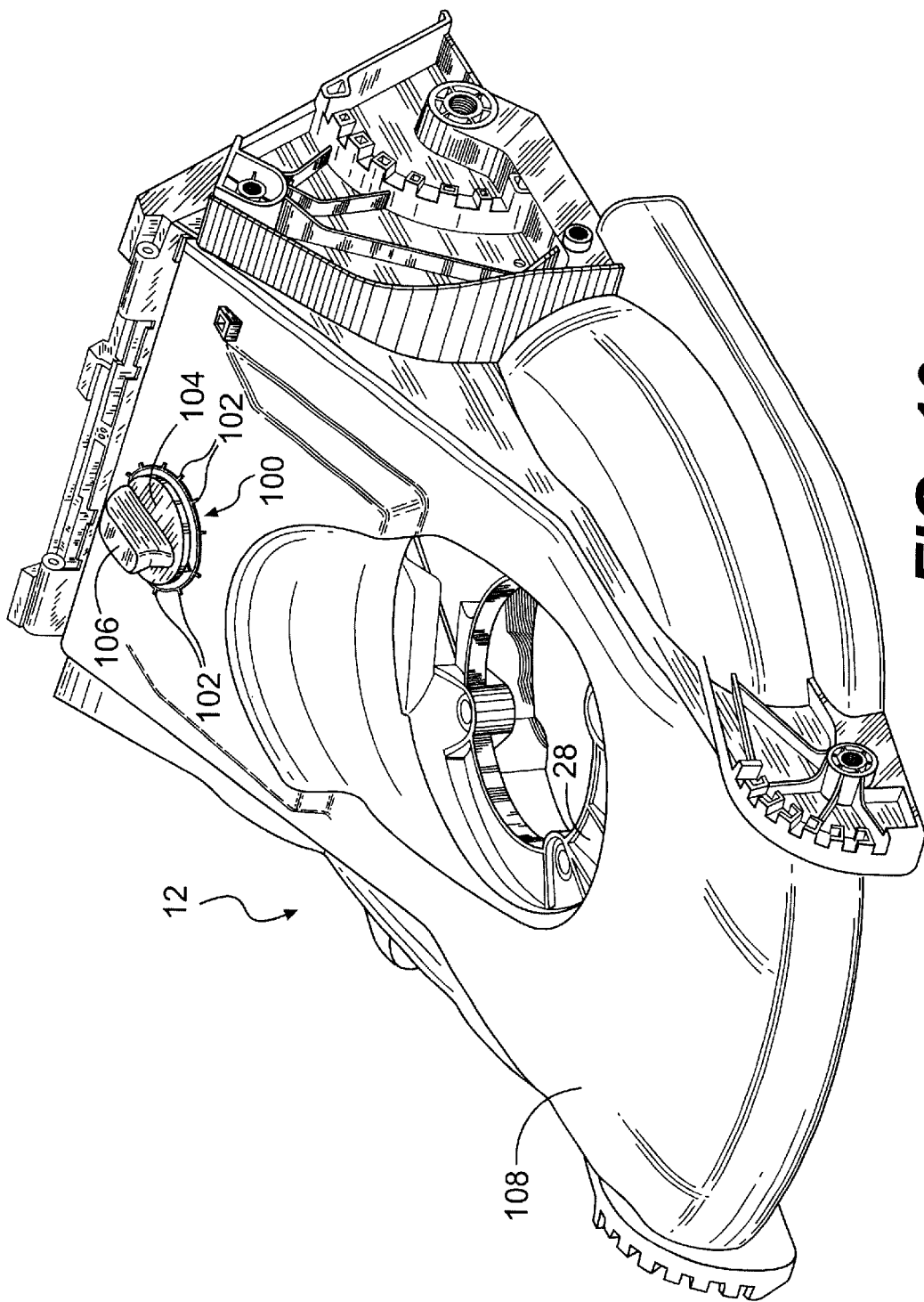
FIG. 10 is a front perspective view of the top of the lawnmower of FIG. 2.

Referring to FIGS. 10 and 11, a handle 100 is connected to the plate 32 and extends external to the cutter housing 24. The handle 100 is displaceable between a first position, a second position and at least one position intermediate the first position and the second position. Placement of the handle 100 in the first position translates the plate 32 to the full bagging position. Placement of the handle 100 in the second position translates the plate 32 to the full mulching position. Placement of the handle 100 in the at least one intermediate position translates the plate 32 to the at least one intermediate position.

In the first embodiment, the handle 100 is a rotary knob operatively connected to the plate 32 as will be explained below. As shown in FIG. 10, indicia 102 adjacent the rotary knob 100 indicate the operational state of the plate 32 based on the position of the rotary knob 100 relative to the indicia 102. The rotary knob 100 includes a circular base 104 and an elongated grip 106 extending from the circular base 104. The width of the elongated grip 106 is less than one-half of the diameter of the circular base 104.

FIG. 11 shows the deck 12 with the deck cover 108 (FIG. 10) removed to expose an actuation transmission 110 that connects the rotary knob 100 to the cover 36. The actuation transmission 110 has a first end 112 connected to the rotary knob 100 and a second end 114 connected to the plate 32. The actuation transmission 110 can be a gear assembly that includes a first gear 116 connected to the rotary knob 100 by a shaft 118. A second gear 120 at the second end 112 engages the first gear 116. Preferably, the first gear 116 is a pinion and the second gear 120 is a rack. The pinion 116 engages the rack 120 such that rotary movement of the rotary knob 100 results in linear translation of the cover 36 and the fin 66 between each of the full bagging position, the at least one intermediate position and the full mulching position. This rack and pinion arrangement provides for the positions of the cover 36 and the fin 66 to be infinitely variable between each of the full bagging position, the at least one intermediate position and the full mulching position.

Other arrangements, such as a kinematic linkage or a cable linkage, can be employed in place of the rotary knob 100 and the actuation transmission 110 to move the plate 32 between the full bagging position, the at least one intermediate position and the full mulching position.

FIGS. 12–18 illustrate a second embodiment of the lawnmower accessory. FIGS. 12–14, 16 and 17 show the deck 212 upside down relative to the deck 12 of FIG. 1. The deck 212 includes a cutter housing 214 having a discharge opening 216, an engine mount 218 centrally positioned on the cutter housing 214 and a prime mover (not illustrated—see FIG. 1) supported on the engine mount 218. A blade 222 (FIG. 13) is coupled to the prime mover to rotate within the cutter housing 214 about an axis R2.

Preferably, the blade 222 is a mulching blade configured as either a single cutting element or as multiple cutting elements. The blade 222 rotates about the rotation axis R2 in a blade circle B2 lying in a cutting plane. The vegetation is cut at the level of the cutting plane and circulates adjacent the roof 224 of the cutter housing 214 along a circulation path C2 until a saturation level of circulating clippings is reached. Upon reaching the saturation level, the circulating clippings begin to fall back down across the blade 222 where they are cut again and blown into the lawn below the level of the cutting plane.

Figure 12:
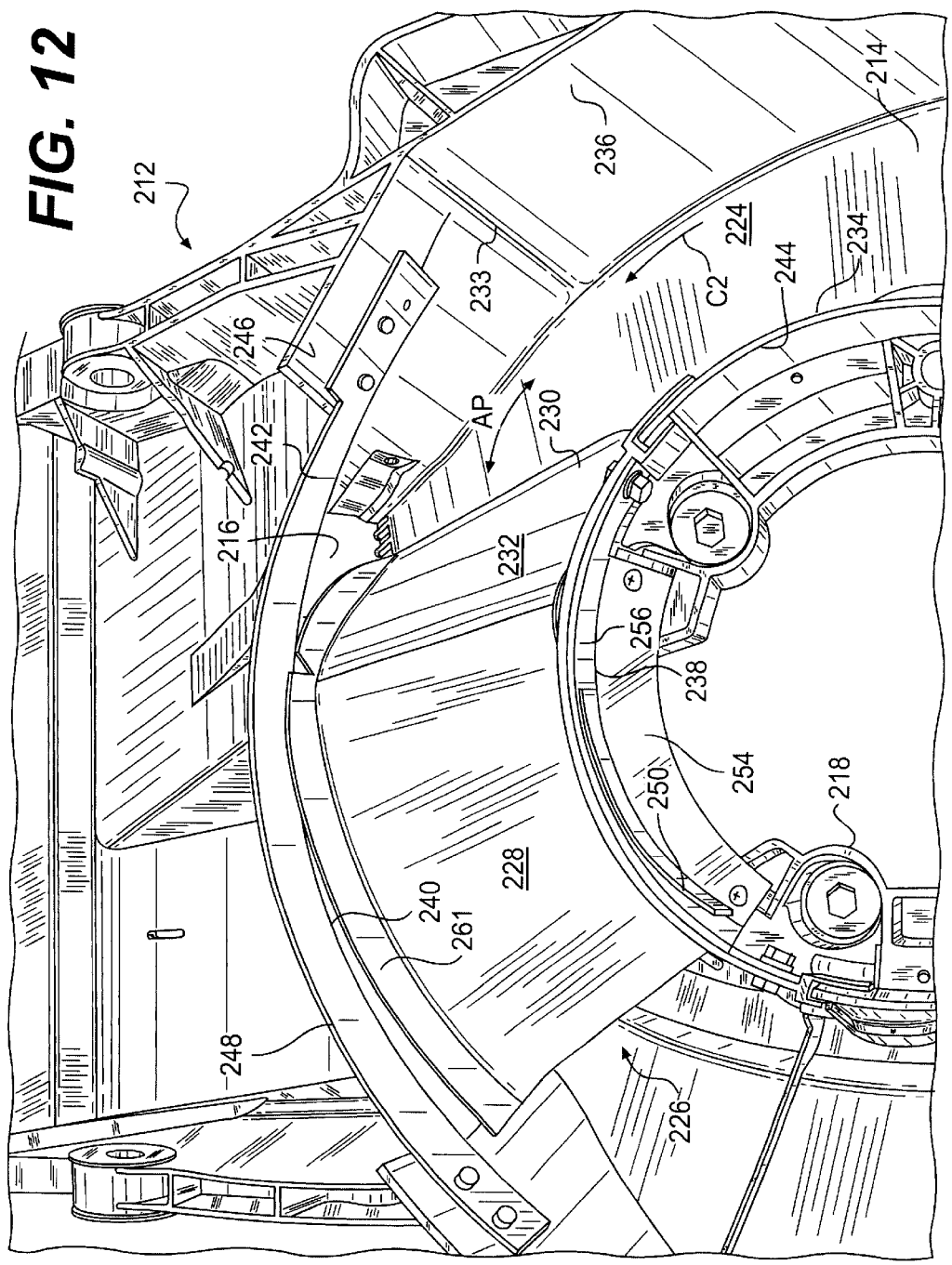
FIG. 12 is a front perspective view of the bottom of a lawnmower including a lawnmower accessory of a second embodiment according to the present invention with the lawnmower accessory in a first position.
Figure 13:
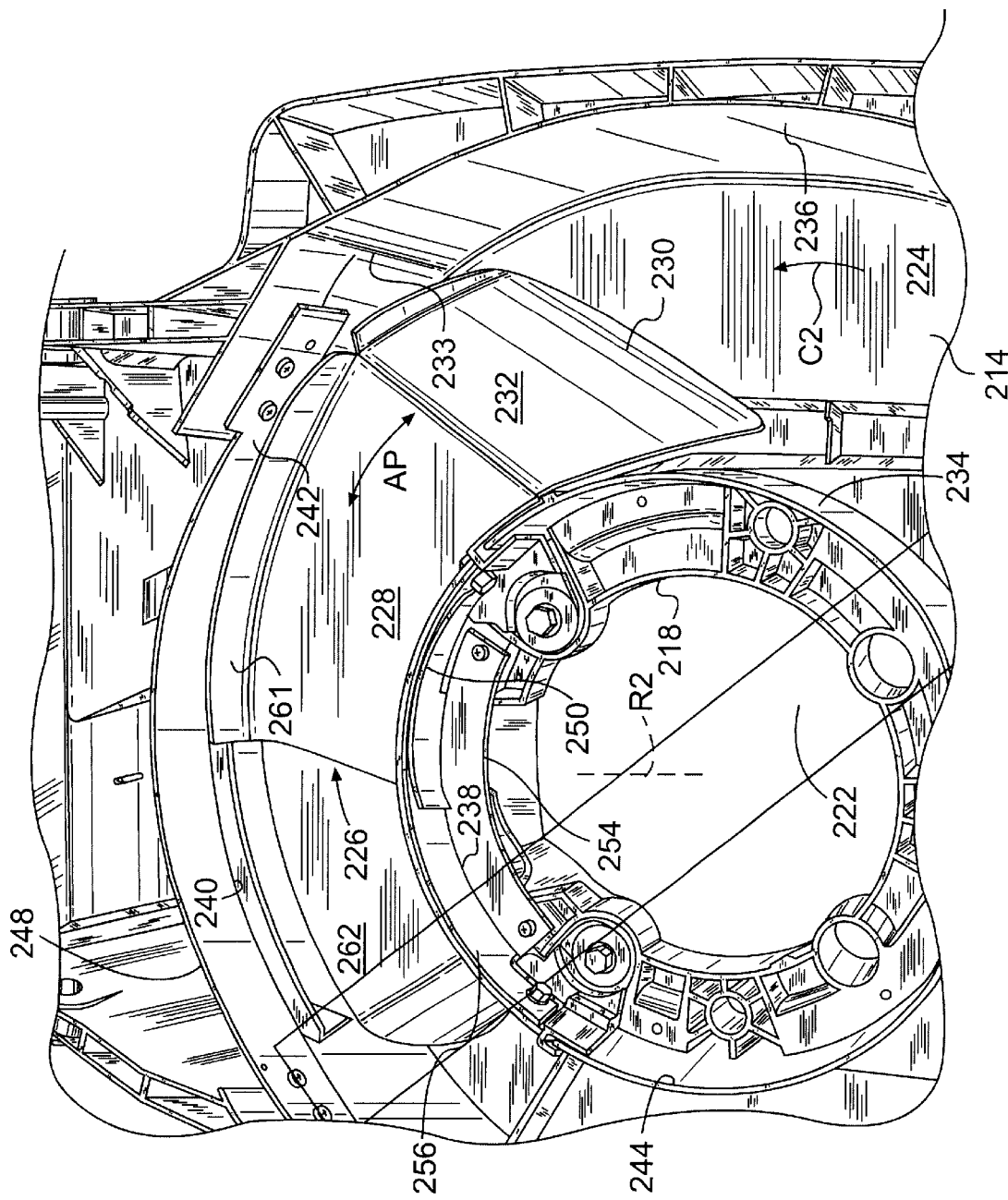
FIG. 13 is a front perspective view of the bottom of the lawnmower of FIG. 12 with the lawnmower accessory in a second position.

FIGS. 12–18 show a second embodiment of a lawnmower accessory 226 configured as a plate that translates within the cutter housing 214 between a first position (FIG. 12) and a second position (FIG. 13). In this second embodiment of the lawnmower accessory, the plate 226 translates along an arcuate path AP between the first position and the second position. During such arcuate translation, every point of the plate is displaced between a corresponding first position and a corresponding second position spaced by a respective arcuate distance.

Figure 14:
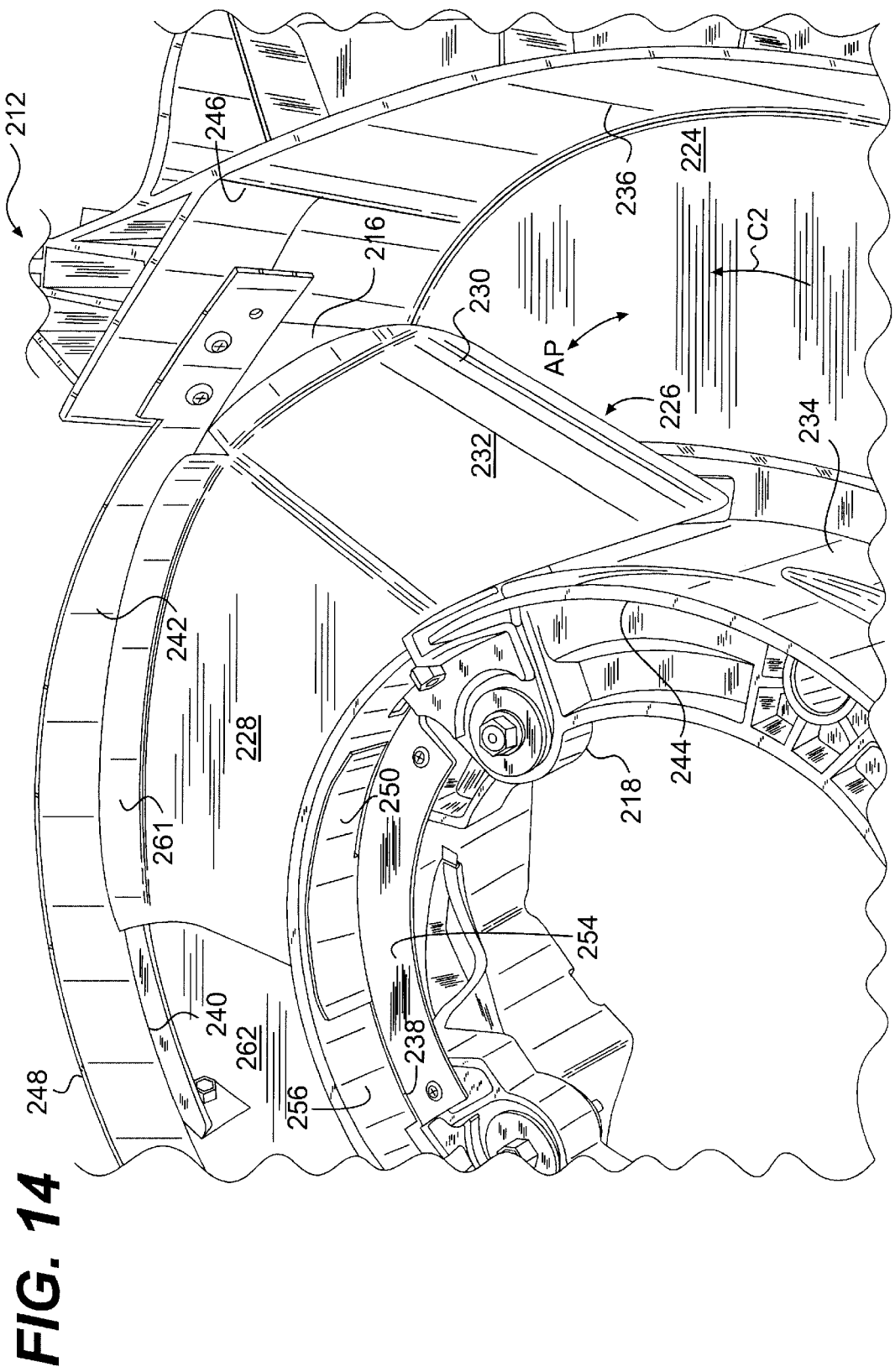
FIG. 14 is a front perspective view of the bottom of the lawnmower of FIG. 12 with the lawnmower accessory in an intermediate position.

The first position can be a full bagging position where the discharge opening 216 is substantially unobstructed by the plate 226 (FIG. 12) and the second position can be a full mulching position where the plate 226 substantially obstructs the discharge opening (FIG. 13). Additionally, the plate 226 can translate to at least one position intermediate the first position and the second position (FIG. 14). Preferably, the cutter housing 214 is annular and the plate 226 extends circumferentially across a sector of the cutter housing 214.

Figure 15:
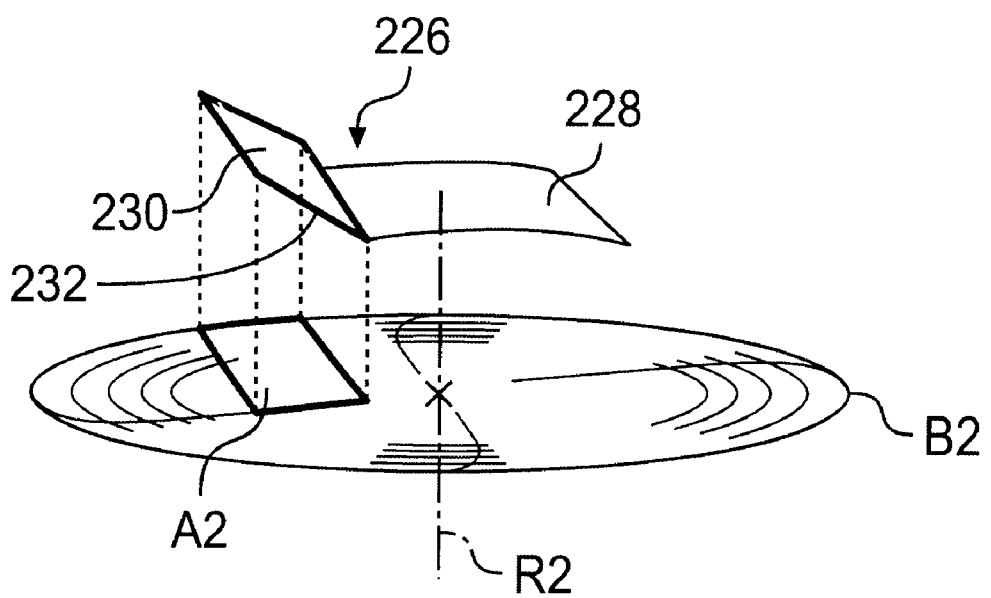
FIG. 15 is a front perspective view of the top of a lawnmower accessory of FIG. 12.
Figure 16:
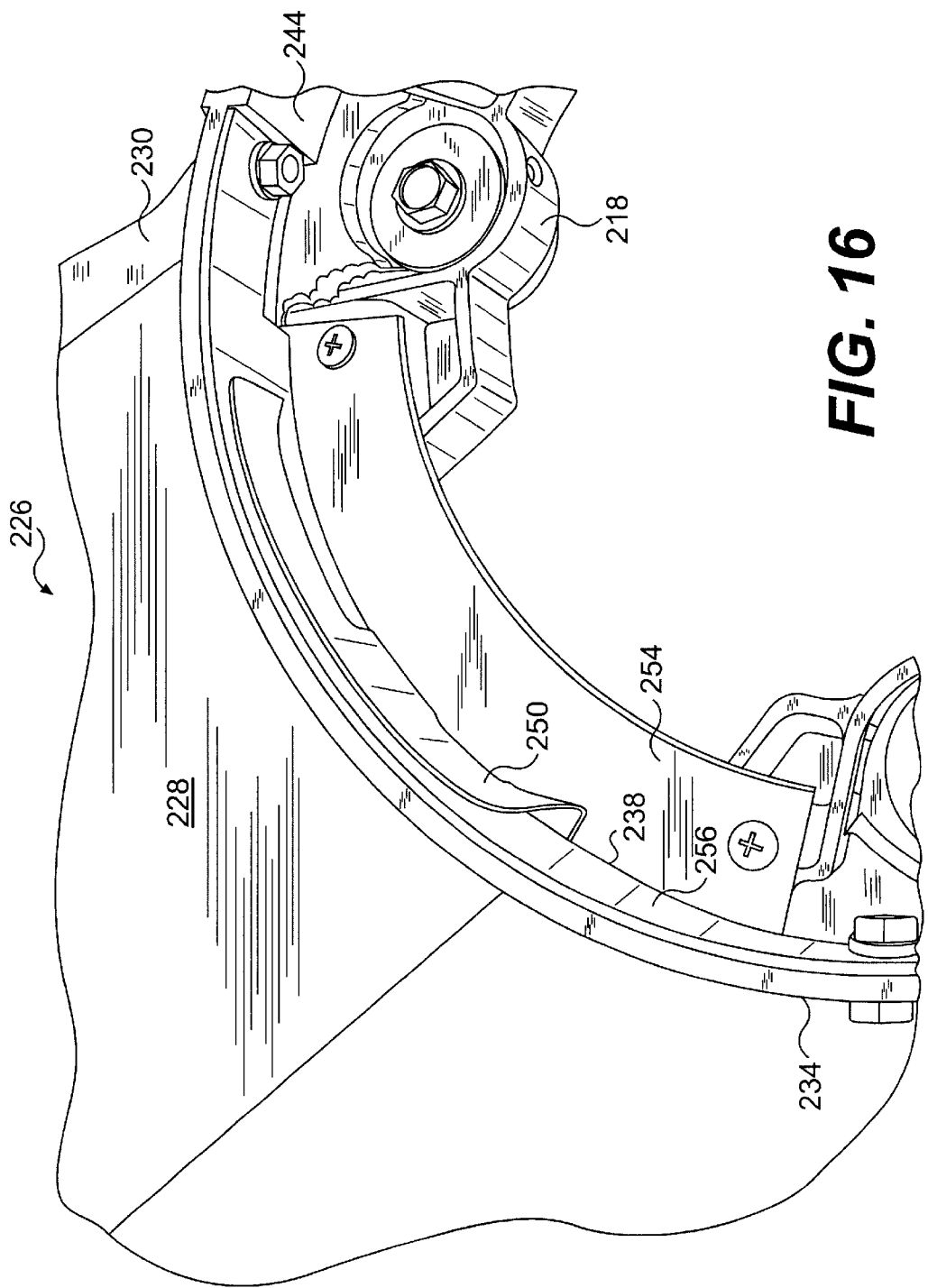
FIG. 16 is an enlarged perspective view of the inner portion of the bottom of the lawnmower of FIG. 12.

Referring to FIG. 15, the plate 226 includes a horizontal wall 228 extending parallel to the blade circle B2 and a cover 230 extending from the horizontal wall 228 and upwardly away from the cutting plane. As shown in FIGS. 12–15, the cover 230 extends obliquely from the horizontal wall 228. In this second embodiment, the horizontal wall 228 is flat and the cover 230 is flat. As shown in FIG. 15, the cover 230 has a major operating face 232 that extends obliquely so that it projects an area A2 onto the blade circle B2 at a location where the plate 226 overlaps the cutting plane.

As shown in FIGS. 12–15, the major operating face 232 controls the circulation of the clippings within the cutter housing 214. As the major operating face 232 translates between the full bagging position and the full mulching position, the major operating face 232 extends by various degrees into the circulation path C2 of the clippings circulating in the cutter housing 214. The circulating clippings that strike the major operating face 232 of the cover 230 are redirected by the cover 230 from the roof 224 of the cutter housing 214 toward the blade 222 where they are mulched and blown into the lawn by the blade 222. When the cover 230 is in the full mulching position, the discharge opening is substantially obstructed the cover 230 (FIG. 13) so that substantially all of the circulating clippings are redirected toward the blade 222 for mulching. When the cover 230 is in any position (FIG. 12 or 14) other than the full bagging position, at least a portion of the discharge opening 216 is unobstructed so that at least some of the circulating clippings can escape from the cutter housing 214 through the discharge opening 216 while the remaining circulating clippings can be mulched.

The discharge opening 216 has a first effective cross-sectional area when the cover 230 is in the full bagging position (FIG. 12), a second effective cross-sectional area when the cover 230 is in the at least one intermediate position (FIG. 14), and a third effective cross-sectional area when the cover 230 is in the full mulching position (FIG. 13).

Referring to FIG. 12, the first effective cross-sectional area is defined by the outer plate support 242, the roof 224, an outer edge generally indicated at 233, and the outer edge of the plate 226. The first effective cross-sectional area is the maximum cross-sectional area for the discharge opening 216.

Referring to FIG. 14, placing the cover 230 in the at least one intermediate position provides a second effective cross-sectional area that is less than the first effective cross-sectional area. The effective second cross-sectional area is defined by the outer plate support 242, the roof 224, the outer edge 233, and the outer edge of the plate 226. A comparison of FIGS. 12 and 14 shows that when in the at least one intermediate position, the outer edge of the plate 226 lies intermediate the full bagging position and the outer edge 233, such that the second effective cross-sectional area is less than the first effective cross-sectional area. The outer edge of the plate 226 can be placed in any one of a plurality of intermediate positions and each intermediate position has a unique effective cross-sectional area.

Referring to FIG. 13, placing the cover 230 in the full mulching position provides an third effective cross-sectional area, which is defined by the outer plate support 242, the roof 224, the outer edge 233, and the outer edge of the plate 226. In this position, the outer edge of the plate 226 is adjacent the outer edge 233 and the third effective cross-sectional area is approximately zero. A comparison of FIGS. 13 and 14 shows that the third effective cross-section is less than the effective second cross-sectional area and a comparison of FIGS. 12 and 13 shows that the third effective cross-sectional area is less than the first effective cross-sectional area.

Under adverse mowing conditions, such as wet vegetation, tall vegetation or thick vegetation, the clippings can clog the discharge opening 216 before the collection bag (not shown—FIG. 1, for example) is full or cause clumping even when mulching the clippings. Also, when such mowing conditions exist when the lawnmower is in the full mulching mode, the amount of clippings circulating in the cutter housing 214 can overwhelm the prime mover 220 and cause it to stall. These results can require repeated stopping and starting of the lawnmower which, in turn, can extend the time necessary to mow the lawn.

By regulating the position of the cover 230 in response to the cutting conditions, the operator can control the amount of grass being collected and mulched at any given time so that clogging, clumping and prime mover (not shown) stalling can be minimized during these adverse mowing conditions. With the cover 230 in the full mulching position, the operator can translate the cover 230 toward the full bagging position if the clippings begin to clump until enough of the clippings pass through the discharge opening 216 and into the collection bag (not shown—see FIG. 1, for example) such that the stalling condition ceases. Conversely, with the cover 230 in the full bagging position, the operator can continue to mow when the access to the collection bag (not shown—see FIG. 1, for example) becomes clogged with clippings by positioning the cover 230 in any position other than the full bagging position so that at least some of the clippings are mulched. Positioning the cover 230 in any one of the intermediate positions minimizes unwanted clumping or stalling of the prime mover 220 because some of the clippings escape the cutter housing 214 through the discharge opening 216 and are collected in the collection bag (not shown—see FIG. 1, for example) while the remainder get mulched.

Referring to FIGS. 12–14, the cutter housing 214 can also include an inner scroll 234 and an outer scroll 236. The inner scroll 234 is centered about the engine mount 218 and located at the inner radius of the cutter housing 214. The outer scroll 236 is centered about the inner scroll 234 and located at the outer radius of the cutter housing 214. The discharge opening 216 (FIGS. 12 and 14) is in the outer scroll 236. The plate 226 extends radially from the inner radius to the outer radius to span from the inner scroll 234 to the outer scroll 236 in each of the first position, the second position and the at least one intermediate position. Preferably, the arcuate path AP is concentric to each of the inner scroll 234 and the outer scroll 236.

Referring to FIGS. 12, 14, 16 and 17, the inner scroll 234 includes an inner slot 238 and the outer scroll 236 includes an outer slot 240. The horizontal plate 228 is slidably received in each of the inner slot 238 and the outer slot 240. An outer plate support 242 is connected to the outer scroll 236 and extends across the discharge opening 216. The inner scroll 234 includes a radially inner surface 244. The outer scroll 236 includes a radially inner surface 246 and a radially outer surface 248.

The plate 226 includes an inner flange 250 extending from the horizontal wall 228 toward the blade circle B2 and an outer flange 252 (FIG. 17) extending from the horizontal wall 228 toward the blade circle B2. The inner flange 250 is radially inward of the inner scroll 234 and the outer flange 252 is radially outward of the outer scroll 236. The inner flange 250 slides along the inner scroll 234 and the outer flange 252 slides along the outer scroll 236 and the outer plate support 242 as will be explained below.

The convertible lawnmower illustrated in FIGS. 12–18 also includes an inner track and an outer track. Referring to FIGS. 12–14 and 16, the inner track includes a first guide 254 and a second guide 256. The first guide 254 is connected to the engine mount 218 adjacent the inner surface 244 of the inner scroll 234. The first guide 254 extends parallel to the horizontal wall 228. The second guide 256 is connected to and extends along the inner surface 244 of the inner scroll 234. The second guide 256 is spaced from the first guide 254 by the inner slot 238.

Figure 17:
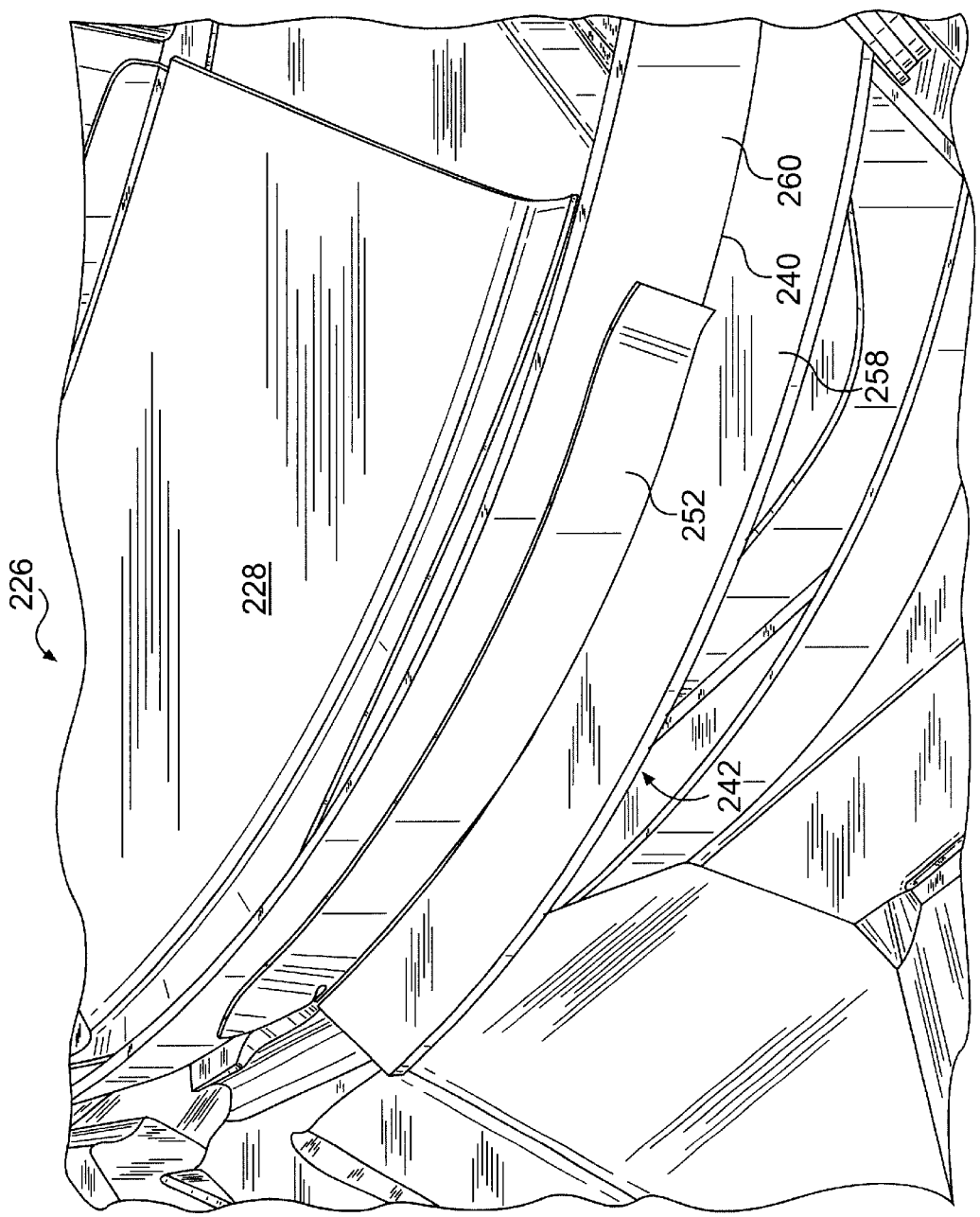
FIG. 17 is an enlarged perspective view of the outer portion of the bottom of the lawnmower of FIG. 12.

Referring to FIG. 17, the outer track includes a third guide 258 and a fourth guide 260. The third guide 258 is connected adjacent the outer surface 248 of the outer scroll 236 and extends parallel to the horizontal wall 228. The fourth guide 260 is connected to and extends along the outer surface 248 of the outer scroll 236. The fourth guide 260 is spaced from the third guide 258 by the outer slot 240 and is aligned with the outer plate support 242. Preferably, the fourth guide 260 can be integral with the outer plate support 242. The inner flange 250 is radially inward of the second guide 256 and the outer flange 252 is radially outward of the fourth guide 260 such the inner flange 250 is guided by the second guide 256 and the outer flange 252 is guided by the fourth guide 260 as the cover 230 translates between the full bagging position and the full mulching position.

The outer plate support 242 and the guides 254, 256, 258, 260 are shown in FIGS. 12–14, 16 and 17 as separate pieces. Alternatively, the outer plate support 242, the third guide 258 and the fourth guide could be integrally formed as a single piece with the outer scroll 236. Likewise, the first guide 254 and the second guide 256 could be integrally formed as a single piece with the inner scroll 234. The outer plate support 242 and the guides 254, 256, 258, 260 can be made from plastic or metal or a combination of different materials optimized to promote the particular function of each component 242, 254, 256, 258, 260 and or assembly of the plate 226 into the cutter housing 214.

Preferably, as shown in FIGS. 12–14 and 17, a deflector 261 extends up from and along the horizontal wall 228. The deflector 261 is arcuate and extends adjacent the radially inner surface of the outer plate support 242. The deflector 261 diverts circulating clippings away from the third guide 258 and the outer slot 240 to prevent the clippings from hindering movement of the plate 226 along the arcuate path AP.

FIGS. 12–17 illustrate the plate 226 as having the horizontal wall 228, the cover 230, the inner flange 250, the outer flange 252, and the deflector 261 can be integrally formed as a single piece. Alternatively, these components can be formed individually or as various subassemblies and then secured together by mechanical fasteners, adhesive, welding or other similar fastening technique. The plate 226 can be made from plastic or metal or a combination of different materials optimized to promote the particular function of each component 228, 230, 250, 252, 261 of the plate 226 and or assembly of the plate 226 into the cutter housing 214.

During the preferred assembly of the plate 226, the first guide 254 and the third guide are secured to the inner scroll 234 and the outer scroll 236, respectively. Then, the plate 226 is positioned on the first guide 254 and the third guide 258. Next, the second guide 256 and the fourth guide 260 are secured to the inner scroll 234 and the outer scroll 236, respectively, and spaced above the first guide 254 and the third guide 256 to provide the inner slot 238 and the outer slot 240. This retains the plate 226 in the cutter housing 214 so that it can translate along the arcuate path AP between the full bagging position and the full mulching position.

Referring to FIGS. 13 and 14, a belt drive housing 262 extends into the cutter housing 214 adjacent the discharge opening 216. The horizontal wall 228 slides along the inner and outer tracks across the belt drive housing 262.

Figure 9:
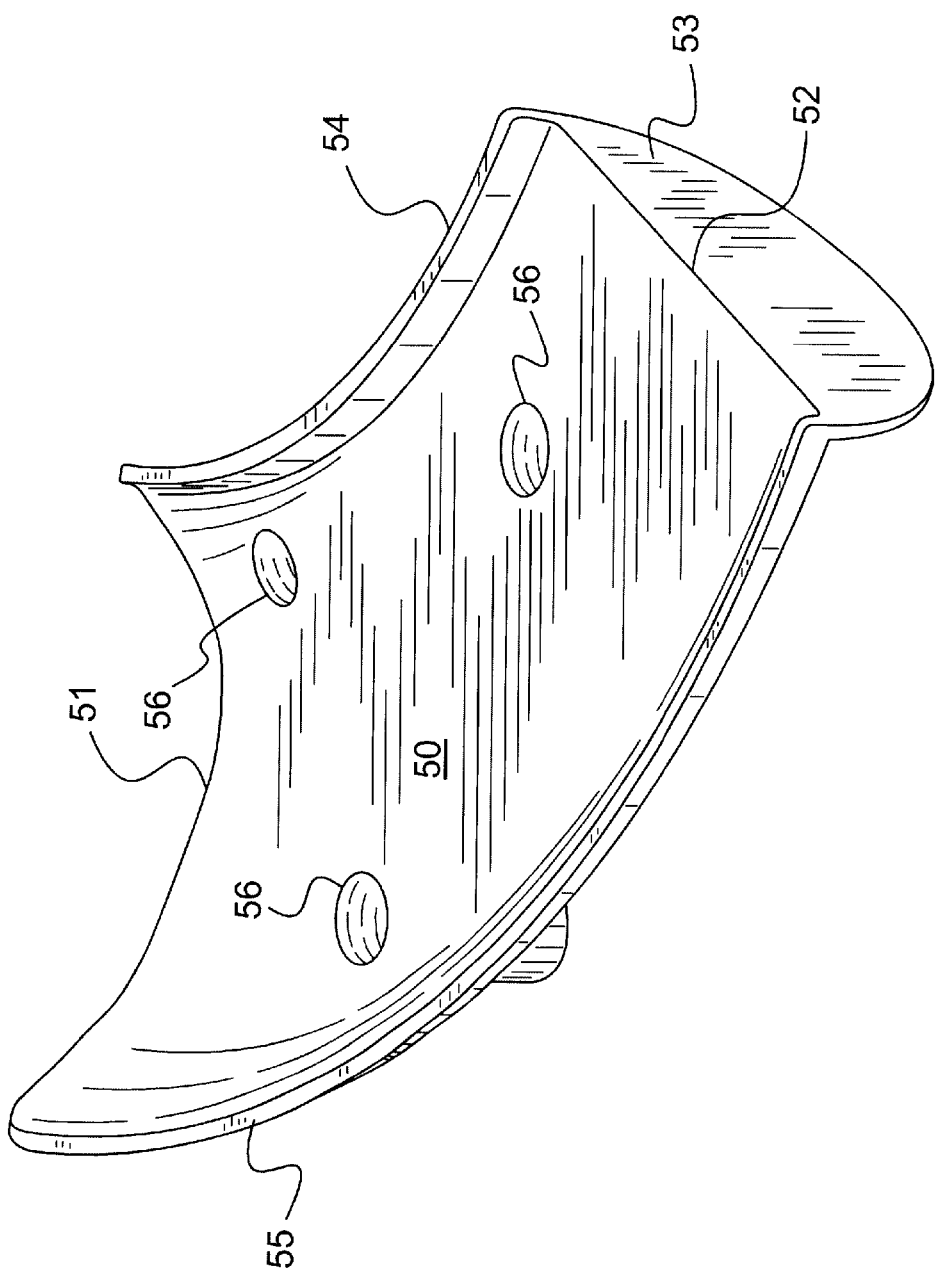
FIG. 9 is a perspective view of a ramp for use in the lawnmower of FIG. 2.

Preferably, a ramp (not illustrated) identical to the ramp 50 illustrated in FIGS. 3 and 9 is mounted in the cutter housing 214, as discussed above.

Figure 18:
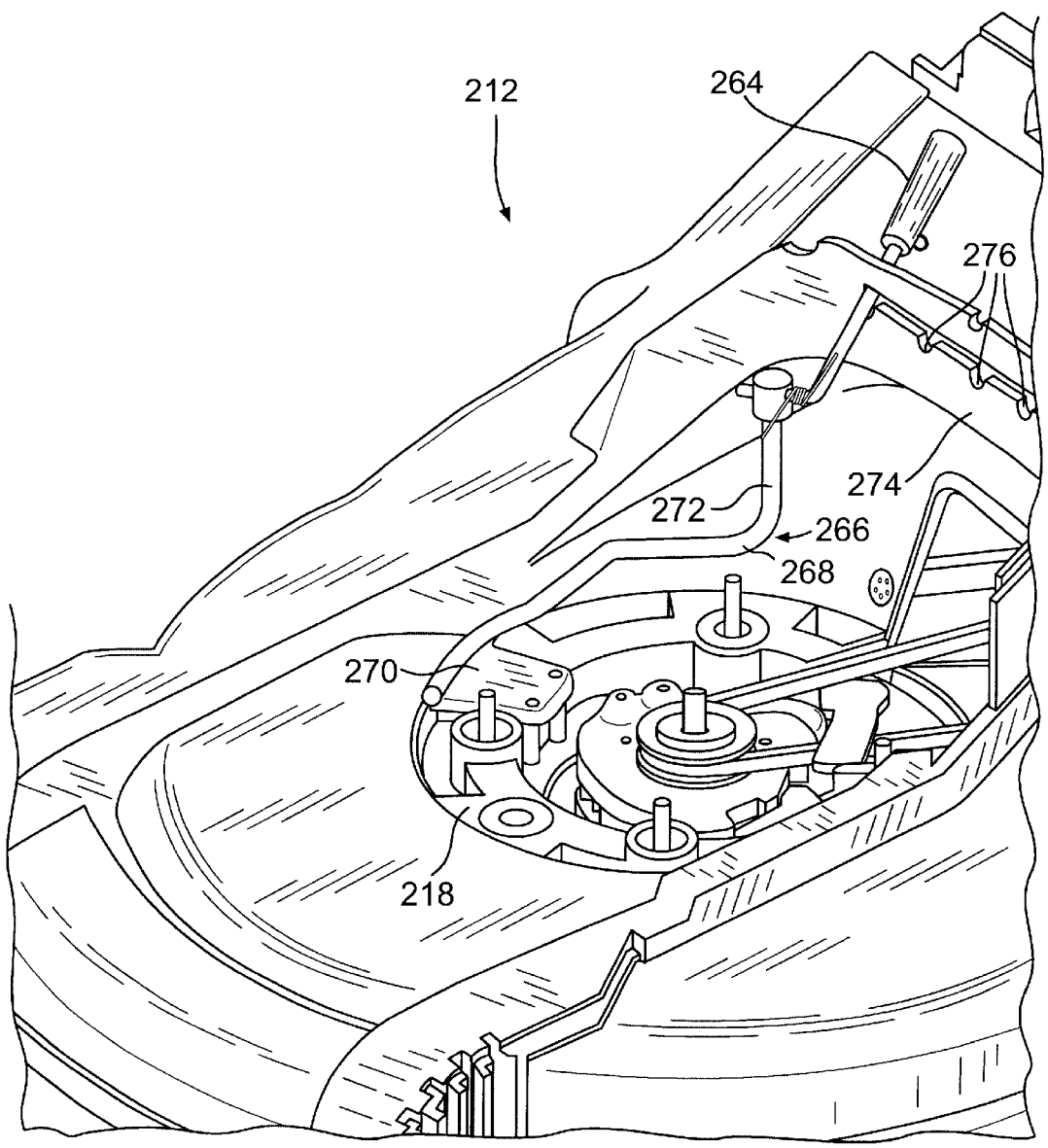
FIG. 18 is a front perspective view of the top of the lawnmower of FIG. 12 showing another embodiment of an actuation transmission according to the invention.

FIG. 18 shows the deck 212 with the deck cover removed to show a handle 264 and an actuation transmission 266. The handle 264 is connected to the cover 230 (not shown) and extends external to the cutter housing 214. The handle 264 is displaceable between a first position, a second position and at least one position intermediate the first position and the second position. Placement of the handle 264 in the first position translates the cover 230 to the full bagging position. Placement of the handle 264 in the second position translates the cover 230 to the full mulching position. Placement of the handle 264 in the at least one intermediate position translates the cover 230 to the at least one intermediate position.

The actuation transmission 266 connects the handle 264 to the cover 230. The actuation transmission 266 includes a link 268 having a first end 270 connected to the cover 230 (not shown) and a second end 272. The handle 264 is pivotally connected to the second end 272 of the link 268. A selector plate 274 is mounted on the deck 212 external to the cutter housing 214 and includes a plurality of slots 276 selectively receiving the handle 264. A torsion spring (not shown) is connected between the handle 264 and the link 268 to bias the handle 264 toward engagement with any one of the plurality of slots 276 to secure the cover 230 in a position between the full bagging position and the full mulching position. Thus, the cover 230 can be positioned in a plurality of discrete positions between the full bagging position and the full mulching position, where each of the plurality of positions corresponds to a respective one of the plurality of slots 276 in the selector plate 274.

Other arrangements, such as a geared arrangement, other kinematic arrangements or a cable linkage, can be employed in place of the handle 264 and the actuation transmission 266 to move the plate 226 between the full bagging position, the at least one intermediate position and the full mulching position.

Although the preferred embodiments illustrate a small walk-behind lawnmower, the invention is also intended for use on commercial walk-behind mowers, riding mowers and lawn tractors.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What I claim is:

1. A lawnmower comprising:
   a cutter housing;
   an engine mount on the cutter housing;
   a prime mover supported on the engine mount;
   a blade coupled to the prime mover to rotate within the cutter housing; and
   a plate that translates within the cutter housing between a first position and a second position.

2. The lawnmower according to claim 1, wherein the cutter housing includes a discharge opening;
   the blade comprises a mulching blade;
   the first position comprises a full bagging position where the discharge opening is substantially unobstructed by the plate; and
   the second position comprises a full mulching position where the plate substantially obstructs the discharge opening.

3. The lawnmower according to claim 1, further comprising at least one position intermediate the first position and the second position.

4. The lawnmower according to claim 1, wherein the blade rotates in a blade circle lying in a cutting plane and the plate includes:
   a horizontal wall extending parallel to the blade circle; and
   a cover extending from the horizontal wall and away from the blade circle.

5. The lawnmower according to claim 4, wherein the cover extends obliquely from the horizontal wall.

6. The lawnmower according to claim 1, further comprising a ramp secured in the cutter housing proximate the plate.

7. The lawnmower according to claim 1, wherein the cutter housing is annular and the plate extends across a sector of the cutter housing.

8. The lawnmower according to claim 7, wherein the plate extends radially from the inner radius of the annular cutter housing to the outer radius of the annular cutter housing when the plate is in each of the first position, the second position and the at least one intermediate position.

9. The lawnmower according to claim 7, wherein the cutter housing includes:
   an inner scroll centered about the engine mount; and
   an outer scroll centered about the inner scroll, the discharge opening is in the outer scroll; and
   the plate spans from the inner scroll to the outer scroll in each of the first position, the second position and the at least one intermediate position.

10. The lawnmower according to claim 9, further comprising an outer plate support connected to the outer scroll;
    wherein the plate is slidably received on the outer plate support.

11. The lawnmower according to claim 10, wherein the plate includes a flange slidably received on the outer plate support.

12. The lawnmower according to claim 10, wherein the outer plate support extends across the discharge opening.

13. The lawnmower according to claim 10, wherein the outer plate support has a curvature equal to the curvature of the outer scroll.

14. The lawnmower according to claim 10, further comprising an inner plate support adjacent the inner scroll;
    wherein the plate is slidably received on the inner plate support.

15. A lawnmower convertible between a bagging mode and a mulching mode, the convertible lawnmower comprising:
    a cutter housing having a discharge opening;
    an engine mount centrally positioned on the cutter housing;
    a prime mover supported on the engine mount;
    a mulching blade coupled to the prime mover to rotate in a blade circle within the cutter housing;
    a cover that translates across the discharge opening between a full bagging position where cover is laterally spaced from the discharge opening and a full mulching position where the cover spans the discharge opening; and
    a fin connected to and extending from the cover toward the mulching blade.

16. The convertible lawnmower according to claim 15, further comprising at least one position intermediate the full bagging position and the full mulching position where the cover partially obstructs the discharge opening.

17. The convertible lawnmower according to claim 15, wherein the cover translates between each of the full bagging positions, the at least one intermediate position and the full mulching position along a linear path.

18. The convertible lawnmower according to claim 15, wherein
    the cutter housing further includes:
       a horizontal slot spaced from the discharge opening;
       a vertical slot adjacent the discharge opening; and
       a cover support aligned with the vertical slot and extending across the discharge opening; and
    wherein the convertible lawnmower further comprises:
       a horizontal wall laterally extending from the cover and slidably engaging the horizontal slot; and
       a flange extending downwardly from the plate and slidably engaging the vertical slot and the cover support.

19. The convertible lawnmower according to claim 18, wherein the fin includes a first end connected to the cover and a second end positioned beyond the extent of the cover.

20. The convertible lawnmower according to claim 19, wherein the cutter housing further includes:
   an inner scroll centered about the engine mount;
   an outer scroll centered about the inner scroll, the discharge opening is formed in the outer scroll;
   wherein the second end of the fin engages the inner scroll when the fin is in the full bagging position, the second end of the fin is intermediate the inner scroll and the outer scroll when the fin is in the at least on intermediate position and the second end of the fin engages the outer scroll when the fin is in the full mulching position.

21. The convertible lawnmower according to claim 20, wherein the cutter housing further comprises a shelf extending from the inner scroll, the second of the fin slidingly engages the shelf when the fin is in the full bagging position.

22. The convertible lawnmower according to claim 20, wherein the first end of the fin lies adjacent the outer scroll at a first location when the fin is in the full bagging position, the first end of the fin lies adjacent the outer scroll at a second location spaced from the first location when the fin is in the full mulching position and the first end of the fin lies adjacent the outer scroll at a location intermediate the first location and the second location when the fin is in the at least one intermediate position.

23. The convertible lawnmower according to claim 19, wherein the fin further comprises a guide extending from the first end of the fin and toward the horizontal wall and spaced above the plate to define a slot therebetween, wherein the guide engages the support when the fin translates from the full bagging position and the full mulching position.

24. The convertible lawnmower according to claim 23, wherein the guide further comprises an arcuate face engaging the outer scroll in each of the full bagging position, the at least one intermediate position and the full mulching position.

25. The convertible lawnmower according to claim 24, wherein the horizontal wall includes a flange slidably engaged with the vertical slot.

26. The convertible lawnmower according to claim 25, wherein the flange extends tangentially from the arcuate face of the guide.

27. The convertible lawnmower according to claim 18, wherein the cover extends away from the blade circle.

28. The convertible lawnmower according to claim 27, wherein the fin extends from the cover toward the blade circle and beyond the level of the horizontal wall.

29. The convertible lawnmower according to claim 28, wherein the cover is concave, the fin is arcuate and the horizontal wall is flat.

30. The convertible lawnmower according to claim 18, further comprising a belt drive housing extending into the cutter housing adjacent the discharge opening; the horizontal slot opening into the belt drive housing.

31. The convertible lawnmower according to claim 30, wherein the cutter housing further includes a recess intermediate the discharge opening and the belt drive housing, the recess receives the cover when the cover is in the full bagging position.

32. A lawnmower convertible between a bagging mode and a mulching mode, the convertible lawnmower comprising:
   a cutter housing having a discharge opening;
   an engine mount centrally positioned on the cutter housing;
   a prime mover supported on the engine mount;
   a mulching blade coupled to the prime mover to rotate in a blade circle within the cutter housing; and
   a cover that translates along an arcuate path in the cutting chamber between a full bagging position where the cover is laterally spaced from the discharge opening and a full mulching position where the cover obstructs the discharge opening.

33. The convertible lawnmower according to claim 32, further comprising at least one position intermediate the full bagging position and the full mulching position where the cover partially obstructs the discharge opening.

34. The convertible lawnmower according to claim 32, further comprising a horizontal wall connected to the cover at an oblique angle.

35. The convertible lawnmower according to claim 32, wherein the cutter housing is annular and includes:
   inner scroll centered about the engine mount and includes an inner slot; and
   an outer scroll centered about the inner scroll and the discharge opening is in the outer scroll;
   wherein the horizontal plate and the cover each span from the inner scroll to the outer scroll in each of the full bagging position, the at least one intermediate position and the full mulching position.

36. The convertible lawnmower according to claim 35, wherein the arcuate path is parallel to each of the inner scroll and the outer scroll.

37. The convertible lawnmower according to claim 35, wherein the inner scroll includes an inner slot and the outer scroll includes an outer slot;
   wherein the horizontal wall is slidably received in each of the inner slot and the outer slot.

38. The convertible lawnmower according to claim 37, further comprising an outer plate support connected to the outer scroll, the outer plate support extends from the outer slot across the discharge opening.

39. The convertible lawnmower according to claim 37, wherein the inner scroll includes a radially inner surface;
   the outer scroll includes a radially inner surface and a radially outer surface; and
   the convertible lawnmower further comprises:
      an inner flange extending down from the horizontal wall toward the blade circle; and
      an outer flange extending down from the horizontal wall toward the blade circle;
      an inner track including:
         a first guide connected to the engine mount adjacent the inner surface of the inner scroll, the first guide extends parallel to the horizontal wall; and
         a second guide connected to and extending along the inner surface of the inner scroll, the second guide is spaced from the first guide by the inner slot;
      an outer track including:
         a third guide connected adjacent the outer surface of the outer scroll, the third guide extends parallel to the horizontal wall; and
         a fourth guide connected to and extending along the outer surface of the outer scroll, the fourth guide is spaced from the third guide by the outer slot;
      the inner flange is radially inward of the second guide and the outer flange is radially outward of the fourth guide;
      the inner flange is guided by the second guide and the outer flange is guided by the fourth guide as the cover translates between the full bagging position and the full mulching position.

40. The convertible lawnmower according to claim 39, wherein the fourth guide is aligned with the outer support.

41. The convertible lawnmower according to claim 40, wherein the fourth guide is integral with the outer support.

42. The convertible lawnmower according to claim 35, further comprising:
an inner flange extending down from the horizontal wall toward the blade circle;
an outer flange extending down from the horizontal wall toward the blade circle; and
an outer plate support extending across the discharge opening;
wherein the inner flange is radially inward of the inner scroll and the outer flange is radially outward of the outer scroll;
wherein the inner flange slides along the inner scroll and the outer flange slides along the outer scroll and the outer plate support.

43. The convertible lawnmower according to claim 35, further comprising a first deflector inclined from the horizontal wall toward the outer scroll.

44. The convertible lawnmower according to claim 43, wherein the cover includes a second deflector aligned with the first deflector.

45. A lawnmower convertible between a bagging mode and a mulching mode, the convertible lawnmower comprising:
a cutter housing having a discharge opening;
an engine mount centrally positioned on the cutter housing;
a prime mover supported on the engine mount;
a mulching blade coupled to the prime mover to rotate in a blade circle within the cutter housing;
a cover that slides within the cutter housing between a full bagging position where the discharge opening is substantially unobstructed by the cover, a full mulching position where the cover substantially obstructs the discharge opening and at least one position intermediate the full bagging position and the full mulching position; and
a handle connected to the cover and extending external to the cutter housing, the handle is displaceable between a first position, a second position and at least one position intermediate the first position and the second position such that displacement of the handle between each of the first position, the second position and the at least one intermediate position of the handle translates the cover between each of the full bagging position, the full mulching position and the at least one intermediate position of the cover, respectively.

46. The convertible lawnmower according to claim 45, further comprises:
a gear assembly connecting the handle to the cover, the gear assembly includes:
a first gear connected to the handle; and
a second gear connected to the cover.

47. The convertible lawnmower according to claim 46, wherein the first gear is a pinion gear and the second gear is a rack wherein the pinion engages the rack such that rotary movement of the handle results in linear translation of the cover between each of the full bagging position, the at least one intermediate position and the full mulching position.

48. The convertible lawnmower according to claim 47, wherein the positions of the cover and the fin are infinitely variable between each of the full bagging position, the at least on intermediate position and the full mulching position.

49. The convertible lawnmower according to claim 45, further comprises:
a link including a first end connected to the cover and a second end, wherein the handle is pivotally connected to the second end of the link;
a selector plate mounted external to the cutter housing and including a plurality of slots selectively receiving the handle; and
a torsion spring connected between the handle and the link to bias the handle toward engagement with any one of the plurality of slots;
wherein the handle is selectively received in any one of the plurality of slots to secure the cover in a position between the full bagging position and the full mulching position.

50. The convertible lawnmower according to claim 49, wherein the cover is positionable in a plurality of discrete positions between the full bagging position and the full mulching position, each of the plurality of positions corresponding to a respective one of the plurality of slots in the selector plate.

51. A control for a lawnmower accessory comprising:
a selector having a first position, a second position and at least one position intermediate the first position and the second position;
a slidable plate connected to the selector, the plate including a first wall and a second wall extending obliquely from the first wall.

52. The control for a lawnmower accessory according to claim 51, wherein the first position is a full bagging position and the second position is a full mulching position.

53. The variable mulching control according to claim 51, further comprising a fin connected to the mulching degree selector and extending from the plate and away from the cover.

54. The variable mulching control according to claim 53, wherein the fin is connected to the cover and extends perpendicular to the wall.

55. A lawnmower convertible between a bagging mode and a mulching mode, the convertible lawnmower comprising:
a cutter housing having a discharge opening;
an engine mount on the cutter housing;
a prime mover supported on the engine mount;
a mulching blade coupled to the prime mover to rotate within the cutter housing;
a plate that translates within the cutter housing between a full bagging position where the discharge opening is substantially unobstructed by the plate and a full mulching position where the plate substantially obstructs the discharge opening;
a rotary knob operatively connected to the plate; and
indicia adjacent the rotary knob indicating the operational state of the plate based on the position of the rotary knob relative to the indicia.

56. The convertible lawnmower according to claim 55, wherein the rotary knob includes:
a circular base; and
an elongated grip extending from the circular base, the width of the elongated grip being less than one-half of the diameter of the circular base.

57. The convertible lawnmower according to claim 56, further comprising an actuation transmission having a first end connected to the rotary knob and a second end connected to the plate.

58. The convertible lawnmower according to claim 57, wherein the actuation transmission further includes:
- a first gear connectable to the plate; and
- a second gear at the second end engaging the first gear.

59. The convertible lawnmower according to claim 58, wherein the first gear is a pinion gear and the second gear is a rack such that rotation of the rotary knob causes translation of the plate.

60. A lawnmower convertible between a bagging mode and a mulching mode, the convertible lawnmower comprising:
- a cutter housing having a discharge opening;
- a rotary mulching blade mounted to rotate in a cutting plane within the cutter housing; and
- a plate translating within the cutter housing, the plate projecting an area onto the cutting plane at a location where the plate overlaps the cutting plane as the plate moves between a full bagging position where the discharge opening is unobstructed by the plate and a full mulching position where the plate obstructs the discharge opening.

61. The convertible lawnmower according to claim 60, wherein the plate comprises a major operating face that extends obliquely relative to the cutting plane and the major operating face defines the projected area.

62. A method for converting a lawnmower between a first operational mode and a second operational mode, the lawnmower including a discharge chute coupled to a cutter housing via a discharge opening, the method comprising:
- establishing a first effective cross-sectional area for the discharge opening when the lawnmower is in the first operational mode;
- establishing a second effective cross-sectional area different from the first effective cross-sectional area for the discharge opening when the lawnmower is in the second operational mode; and
- establishing a third effective cross-sectional area different from the second effective cross-sectional area for the discharge opening when the lawnmower is in a third operational mode.

63. A method of converting a lawnmower between a first operational mode, a second operational mode, and a third operational mode, the lawn mower including a discharge chute coupled to a cutter housing via an discharge opening, the method comprising:
- varying the effective cross-sectional area of the discharge opening to switch the lawnmower between the first operational mode, the second operational mode, and the third operational mode.

64. A method of varying operational modes of a lawnmower comprising:
- changing the effective cross-sectional area of a discharge opening that couples a discharge chute to a cutter housing between one of a first area, a second area different from the first area, and a third area different from the second area.

* * * * *